US011751043B2

(12) United States Patent
Lee et al.

(10) Patent No.: US 11,751,043 B2
(45) Date of Patent: *Sep. 5, 2023

(54) DEVICE AND METHOD FOR PROVIDING NETWORK SLICE INTERWORKING IN WIRELESS COMMUNICATION SYSTEM

(71) Applicant: Samsung Electronics Co., Ltd., Suwon-si (KR)

(72) Inventors: Hoyeon Lee, Suwon-si (KR); Jungshin Park, Suwon-si (KR); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

This patent is subject to a terminal disclaimer.

(21) Appl. No.: 17/395,848

(22) Filed: Aug. 6, 2021

(65) Prior Publication Data

US 2021/0368325 A1 Nov. 25, 2021

Related U.S. Application Data

(63) Continuation of application No. 16/749,308, filed on Jan. 22, 2020, now Pat. No. 11,122,416.

(30) Foreign Application Priority Data

| Jan. 22, 2019 | (KR) | 10-2019-0008381 |
| Feb. 14, 2019 | (KR) | 10-2019-0017070 |
| Apr. 1, 2019 | (KR) | 10-2019-0037914 |

(51) Int. Cl.
*H04W 8/08* (2009.01)
*H04W 8/06* (2009.01)
(Continued)

(52) U.S. Cl.
CPC ............ *H04W 8/082* (2013.01); *H04W 8/06* (2013.01); *H04W 76/10* (2018.02);
(Continued)

(58) Field of Classification Search
CPC ..... H04W 24/04; H04W 76/27; H04W 76/22; H04W 76/10; H04W 8/24;
(Continued)

(56) References Cited

U.S. PATENT DOCUMENTS 10,582,379 B2 * 3/2020 Youn .................... H04L 65/1016
10,659,952 B2 * 5/2020 Wang .................... H04W 48/16
(Continued)

FOREIGN PATENT DOCUMENTS

CN 113330817 A * 8/2021 ............ H04W 48/18
EP 3 544 337 A1 9/2019
(Continued)

OTHER PUBLICATIONS

Q. Tang, O. Ermis, C. D. Nguyen, A. D. Oliveira and A. Hirtzig, "A Systematic Analysis of 5G Networks With a Focus on 5G Core Security," in IEEE Access, vol. 10, pp. 18298-18319, 2022, doi: 10.1109/ACCESS.2022.3151000. (Year: 2022).*
(Continued)

*Primary Examiner* — William D Cumming
(74) *Attorney, Agent, or Firm* — Jefferson IP Law, LLP

(57) ABSTRACT

A pre-5th-Generation (5G) or 5G communication system for supporting higher data rates Beyond 4th-Generation (4G) communication system such as Long Term Evolution (LTE), in which a method performed by a user equipment (UE) includes transmitting, to a first base station (BS), a packet data network (PDN) connection request message, receiving, from the first BS, information on a first single-network slice selection assistance information (S-NSSAI) selected by a combination of a packet data network gateway control plane
(Continued)

entity (PGW-C) and a session management function (SMF) from among the UE's at least one subscribed S-NSSAI, transmitting, to a second BS, a registration request message including a requested NSSAI in which the first S-NSSAI is included, and receiving, from the second BS, a registration accept message including an allowed NSSAI in which a second S-NSSAI mapped to the first S-NSSAI is included.

14 Claims, 10 Drawing Sheets

(51) Int. Cl.
    *H04W 76/10* (2018.01)
    *H04W 88/06* (2009.01)
    *H04W 88/16* (2009.01)
    *H04W 84/04* (2009.01)
(52) U.S. Cl.
    CPC .......... *H04W 84/042* (2013.01); *H04W 88/06* (2013.01); *H04W 88/16* (2013.01)
(58) Field of Classification Search
    CPC . H04W 36/0066; H04W 50/04; H04W 48/18; H04W 48/16; H04W 8/18; H04W 8/205; H04W 36/0022; H04W 36/14; H04W 36/0055; H04W 50/00; H04W 75/22; H04W 75/27; H04W 48/02; H04W 8/02; H04W 60/00; H04W 60/04; H04W 12/06; H04W 12/12
    See application file for complete search history.

(56) References Cited

U.S. PATENT DOCUMENTS

| | | | | |
|---|---|---|---|---|
| 10,708,318 | B2 | 7/2020 | Qiao et al. | |
| 10,764,951 | B2* | 9/2020 | Park | H04W 12/06 |
| 10,834,209 | B2 | 11/2020 | Zong et al. | |
| 11,259,220 | B2* | 2/2022 | Zong | H04W 76/12 |
| 11,653,296 | B2* | 5/2023 | Lanev | H04W 68/00 455/435.3 |
| 2019/0029065 | A1* | 1/2019 | Park | H04W 48/02 |
| 2019/0261185 | A1* | 8/2019 | Velev | H04W 48/18 |
| 2019/0297121 | A1 | 9/2019 | Qiao et al. | |
| 2019/0342761 | A1* | 11/2019 | Yu | H04W 8/18 |
| 2019/0394625 | A1* | 12/2019 | Kim | H04W 36/0022 |
| 2020/0053643 | A1* | 2/2020 | Lee | H04W 8/205 |
| 2020/0107230 | A1* | 4/2020 | Zhao | H04W 36/14 |
| 2020/0236528 | A1* | 7/2020 | Lee | H04W 60/04 |
| 2020/0245127 | A1* | 7/2020 | Zong | H04W 8/02 |
| 2020/0252862 | A1* | 8/2020 | Kim | H04W 60/00 |
| 2020/0336517 | A1 | 10/2020 | Qiao et al. | |
| 2020/0374765 | A1* | 11/2020 | Zong | H04W 76/22 |
| 2020/0404565 | A1 | 12/2020 | Won et al. | |
| 2021/0153268 | A1 | 5/2021 | Lee et al. | |
| 2021/0410060 | A1* | 12/2021 | Lanev | H04W 68/00 |
| 2022/0078871 | A1* | 3/2022 | Won | H04W 76/27 |
| 2022/0225178 | A1* | 7/2022 | Zong | H04W 36/0016 |
| 2022/0256439 | A1* | 8/2022 | Casati | H04W 60/00 |
| 2022/0338155 | A1* | 10/2022 | Ryu | H04W 76/10 |

FOREIGN PATENT DOCUMENTS

| | | |
|---|---|---|
| EP | 3 641 424 A1 | 4/2020 |
| RU | 2 386 219 C2 | 4/2010 |
| WO | 2018/064479 A1 | 4/2018 |
| WO | 2018/129437 A1 | 7/2018 |
| WO | 2018/175260 A1 | 9/2018 |
| WO | 2018228137 A1 | 12/2018 |

OTHER PUBLICATIONS

R. Ravindran, P. Suthar, A. Chakraborti, S. O. Amin, A. Azgin and G. Wang, "Deploying ICN in 3GPP's 5G NextGen Core Architecture," 2018 IEEE 5G World Forum (5GWF), Silicon Valley, CA, USA, 2018, pp. 26-32, doi: 10.1109/5GWF.2018.8517046. ( Year: 2018).*
Extended European Search Report dated Feb. 21, 2022, issued in a counterpart European Application No. 20745662.5.
Huawei, HiSilicon; S-NSSAI of VPLMN when HO from 4G to 5G; 3GPP TSG-SA WG2 Meeting #127bis; S2-186212; Jun. 1, 2018, Newport Beach, USA.
3GPP TR 23.740 V0.4.0; 3rd Generation Partnership Project; Technical Specification Group Services and System Aspects; Study on Enhancement of Network Slicing (Release 16), Jul. 27, 2018.
International Search Report dated May 11, 2020, issued in an International Application No. PCT/KR2020/001139.
3GPP TS 23.502 V15.4.1; 3rd Generation Partnership Project; Technical Specification Group Services and System Aspects; Procedures for the 5G System; Stage 2, Jan. 2019. (Release 15).
LG Electronics; Clarification on usage of PLMN ID received via PCO during PDN connection establishment; 3GPP TSG-SA WG2 Meeting #127BIS; S2-186219; Jun. 1, 2018, Newport Beach, California, USA. (revision of S2-186062).
Motorola Mobility, Lenovo, Telecom Italia, Vodafone, AT&T; Considerations regarding URSP rules; SA WG2 Meeting #128-bis; S2-187860; Aug. 24, 2018, Sophia Antipolis, France. (revision of S2-18xxxx).
Huawei; Procedures for Inter-RAT mobility support to and from Nb-IoT; 3GPP TSG-SA WG2 Meeting #130; S2-1900630; Jan. 15, 2019, Kochi, India.
Deploying ICN in 3GPP's 5G NextGen Core Architecture by Ravishankar Ravindran; Prakash Suthar; Asit Chakraborti; Syed Obaid Amin; Aylac Azgin; Guoqiang Wang Published in: 2018 IEEE 5G World Forum (5GWF) Jul. 2018 (Year: 2018).
Russian Decision of Grant dated Jan. 12, 2023, issued in Russian Patent Application No. 2021119555.
Indian Office Action dated Feb. 17, 2023, issued in Indian Patent Application No. 202137037423.
European Office Action dated Apr. 14, 2023, issued in European Patent Application No. 20745662.5.

* cited by examiner

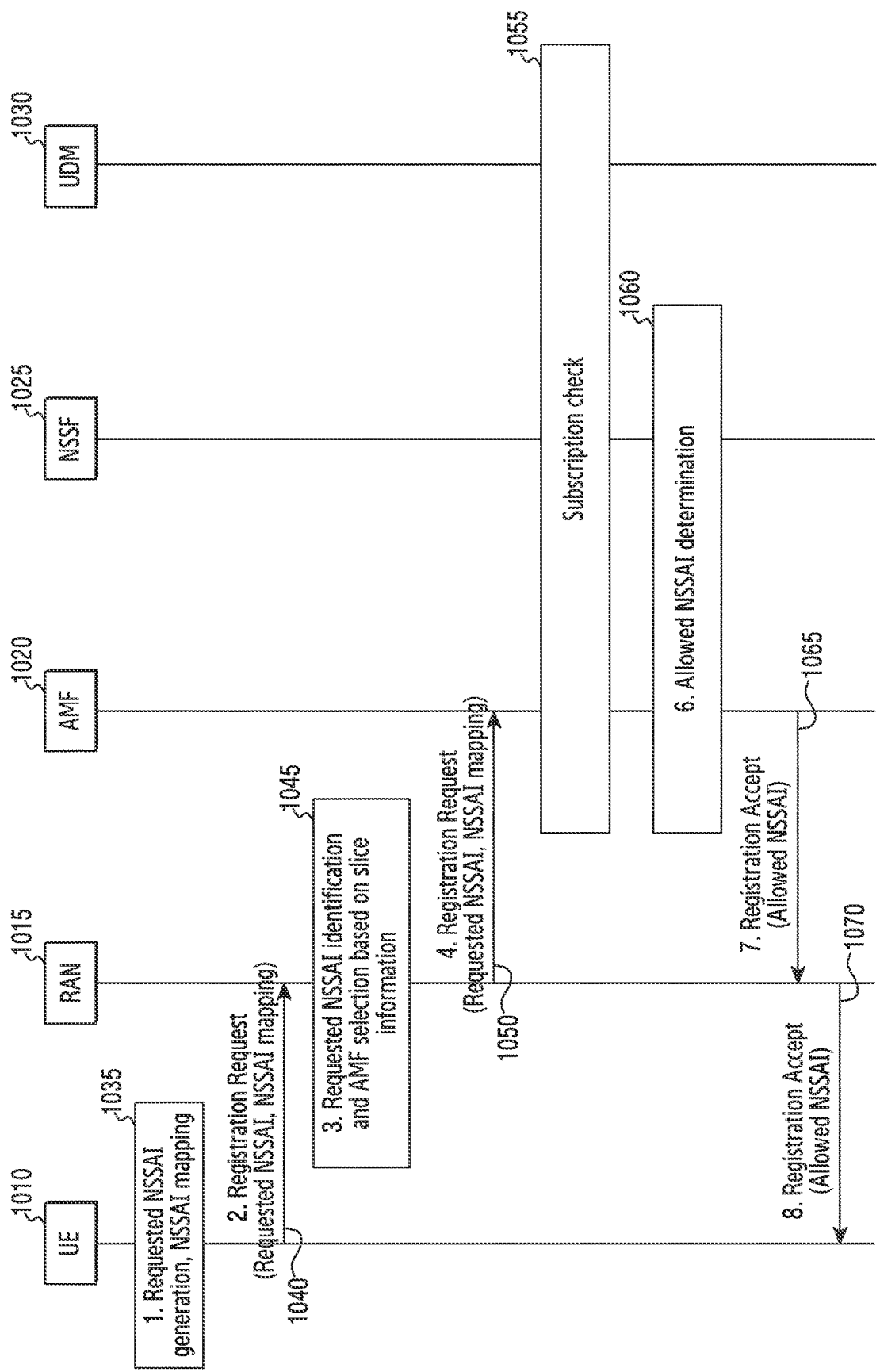

DEVICE AND METHOD FOR PROVIDING NETWORK SLICE INTERWORKING IN WIRELESS COMMUNICATION SYSTEM

CROSS-REFERENCE TO RELATED APPLICATION(S)

This application is a continuation application of prior application Ser. No. 16/749,308, filed on Jan. 22, 2020, which is based on and claimed priority under 35 U.S.C. § 119(a) of a Korean patent application number 10-2019-0008381, filed on Jan. 22, 2019, of a Korean patent application number 10-2019-0017070, filed on Feb. 14, 2019, and of a Korean patent application number 10-2019-0037914, filed on Apr. 1, 2019, in the Korean Intellectual Property Office, the disclosures of each of which are incorporated by reference herein in its entirety.

BACKGROUND

1. Field

The disclosure relates to a wireless communication system. More particularly, the disclosure relates to a device and a method for providing network slicing in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the 5G system, various communication schemes are discussed. For example, a grant-free communication scheme for transmitting data without granting an uplink transmission is proposed. Furthermore, various discussions for supporting the grant-free communication efficiently are underway. The above information is presented as background information only to assist with an understanding of the disclosure. No determination has been made, and no assertion is made, as to whether any of the above might be applicable as prior art with regard to the disclosure.

Based on the above discussion, the disclosure provides a method and a device for interworking between an evolved packet system (EPS) network system and a 5G network system architecture for providing a network slice function in a wireless communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and method for providing network slicing in a wireless communication system.

Additional aspects will be set forth in part in the description which follows and, in part, will be apparent from the description, or may be learned by practice of the presented embodiments.

In accordance with an aspect of the disclosure, a method for operating a user equipment (UE) in a wireless communication system is provided. The method comprises: transmitting, to a first base station (BS), a packet data network (PDN) connection request message; receiving, from the first BS, information on a first single-network slice selection assistance information (S-NSSAI) selected by a combination of a packet data network gateway control plane entity (PGW-C) and a session management function (SMF) from among the UE's at least one subscribed S-NSSAI; transmitting, to a second BS, a registration request message including a requested NSSAI in which the first S-NSSAI is included; and receiving, from the second BS, a registration accept message including an allowed NSSAI in which a second S-NSSAI mapped to the first S-NSSAI is included.

In accordance with another aspect of the disclosure, a user equipment (UE) in a wireless communication system is provided. The UE comprises: a transceiver; and at least one processor operably coupled to the transceiver, and configured to: transmit, to a first base station (BS), a packet data network (PDN) connection request message; receive, from the first BS, information on a first single-network slice selection assistance information (S-NSSAI) selected by a combination of a packet data network gateway control plane entity (PGW-C) and a session management function (SMF) from among the UE's at least one subscribed S-NSSAI; transmit, to a second BS, a registration request message including a requested NSSAI in which the first S-NSSAI is included; and receive, from the second BS, a registration accept message including an allowed NSSAI in which a second S-NSSAI mapped to the first S-NSSAI is included.

A device and a method according to various embodiments of the disclosure provide a method for interworking between an EPS network system and a 5G network system architecture for providing a network slice function, so as to effectively provide a service in a mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 illustrates a 5G network registration procedure of a UE according to an embodiment of the disclosure.

Throughout the drawings, like reference numerals will be understood to refer to like parts, components, and structures.

DETAILED DESCRIPTION

Figure 1:
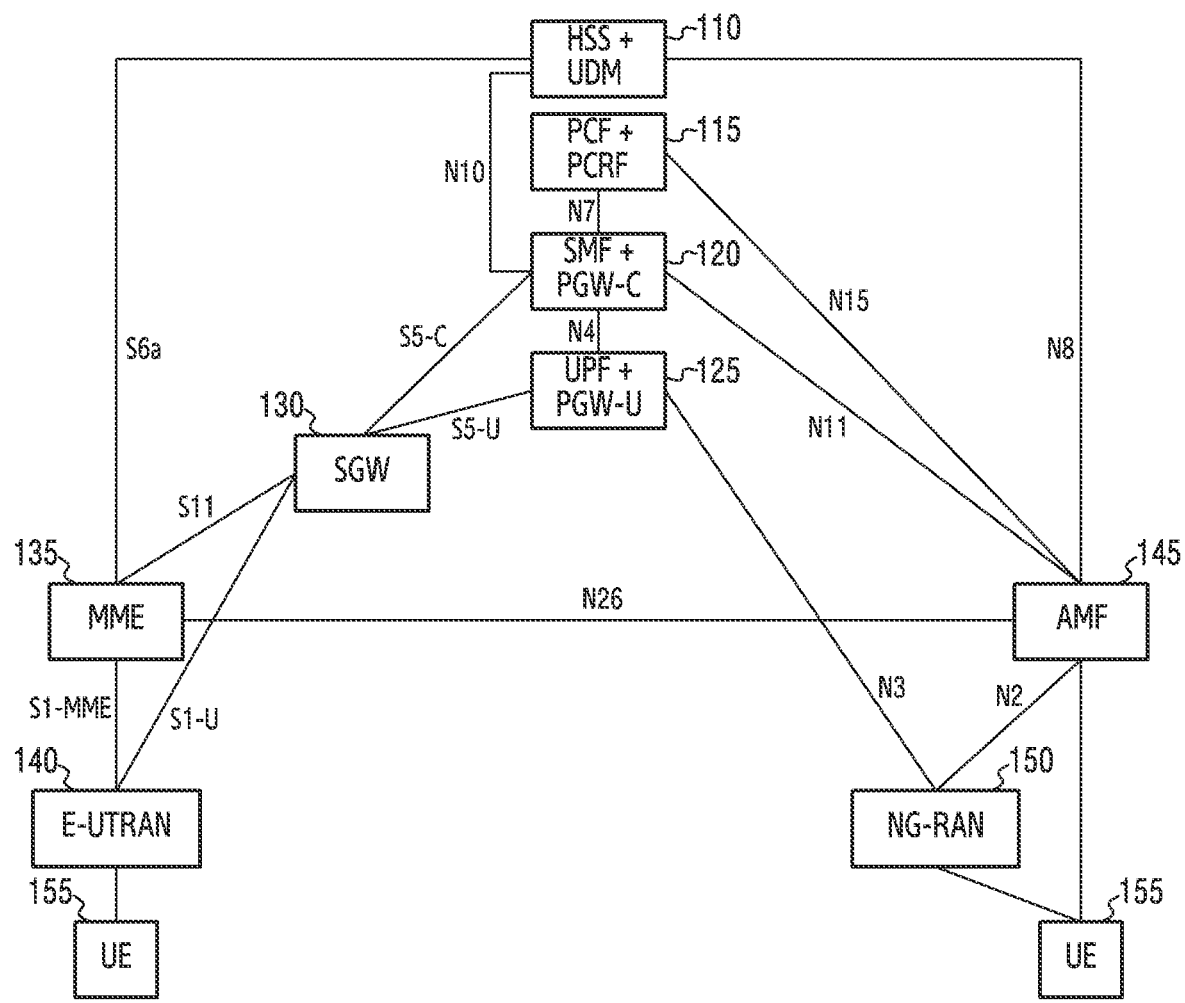
FIG. 1 illustrates a 5G network slice interworking structure (non-roaming) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe specific embodiments, and may not be intended to limit ranges of other embodiments. Unless defined otherwise, all terms used herein, including technical and scientific terms, may have the same meaning as those commonly understood by a person skilled in the art to which the disclosure pertains. Such terms as those defined in a generally used dictionary may be interpreted to have the meanings equal or similar to the contextual meanings in the relevant field of art, and are not to be interpreted to have ideal or excessively formal meanings unless clearly defined in the disclosure. In some cases, even the term defined in the disclosure should not be interpreted to exclude various embodiments of the disclosure.

Hereinafter, various embodiments of the disclosure will be described based on an approach of hardware. However, various embodiments of the disclosure include a technology that uses both hardware and software, thus the various embodiments of the disclosure do not exclude a software-based approach.

The disclosure relates to a device and a method for providing interworking of network slice in a wireless communication system. Specifically, the disclosure describes a technology for interworking between an EPS network system and a 5G network system architecture for providing a network slice function in a wireless communication system.

Terms used below are illustrated for convenience of description, the terms including a term indicating a signal, a term indicating a channel, a term indicating control information, a term indicating a network entity, and a term indicating an element of a device. Accordingly, the disclosure is not limited to the following terms and other terms having the same technical meaning may be used.

In addition, the disclosure describes various embodiments by using terms used in a part of communication standards (for example, a 3rd generation partnership project (3GPP)), but the embodiments are only illustrated for description. Various embodiments of the disclosure may be easily modified and applied to other communication systems.

In 3GPP standards, a 5G network system architecture and procedure is standardized. A mobile carrier can provide several services in a 5G network. In order to provide each service, a mobile carrier is required to meet different service demands for each service (for example, delay time, communication range, data rate, bandwidth, reliability, etc.). To this end, a mobile carrier can constitute a network slice and allocate a network resource suitable for a specific service according to a network slice or a network slice set. The network resource may indicate a network function (NF), a logical resource that the NF provides, or a radio resource allocation of a base station.

For example, a mobile carrier can constitute a network slice A to provide a mobile broadband service, a network slice B to provide a vehicle communication service, and a network slice C to provide an IoT service. As described above, in a 5G network, a corresponding service may be provided on a network slice specialized for each service characteristic. Single-network slice selection assistance information (S-NSSAI) defined by the 3GPP may be used as an identifier which identifies a network slice.

A mobile carrier can operate both a 5G network and an EPS (or called LTE) network. A mobile communication UE can move to the EPS network while accessing the 5G network and using a service. In addition, a mobile communication UE can move to the 5G network while accessing the EPS network and using a service.

Figure 2:
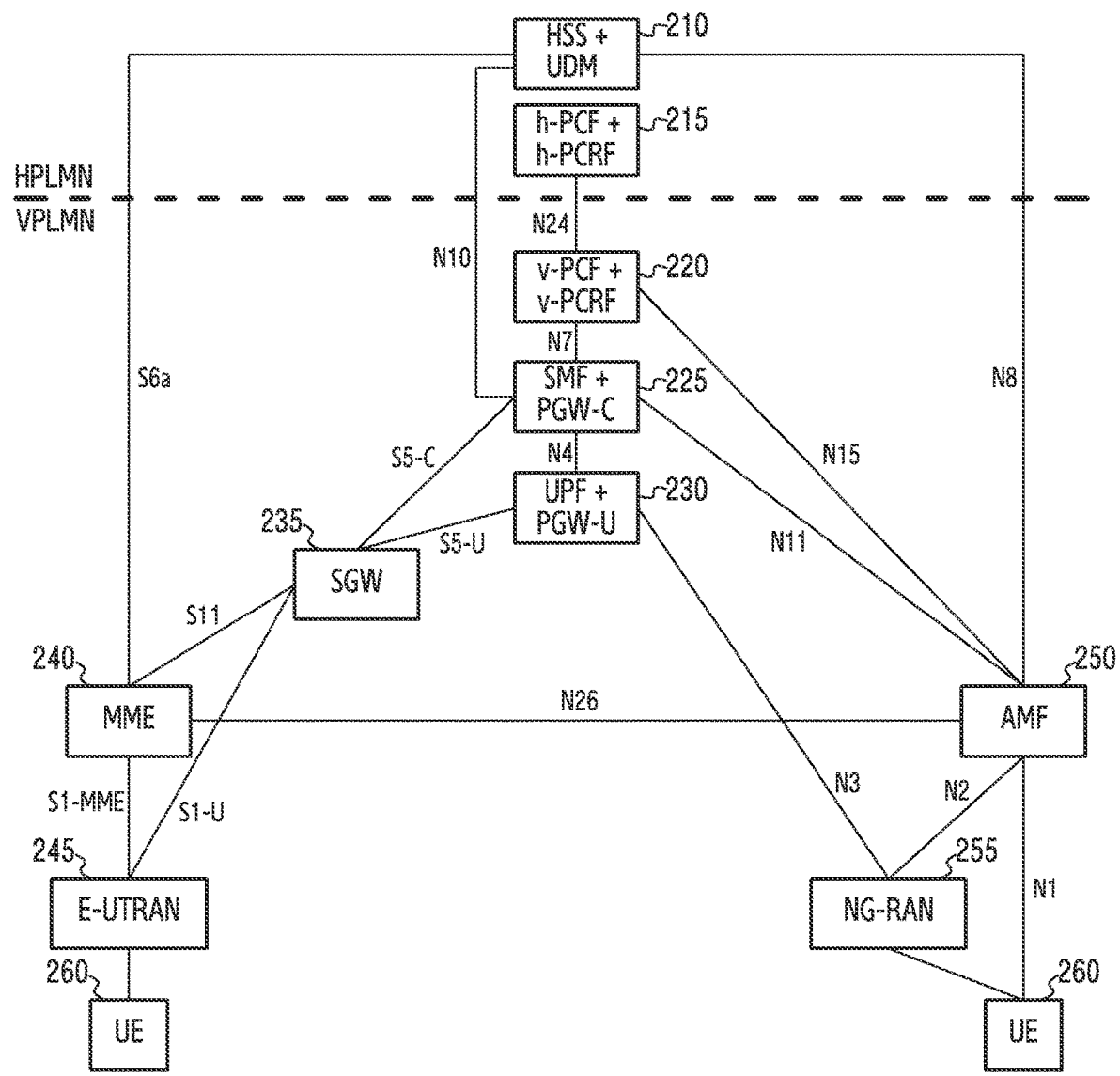
FIG. 2 illustrates a network slice interworking configuration (non-roaming) according to an embodiment of the disclosure.
Figure 3:
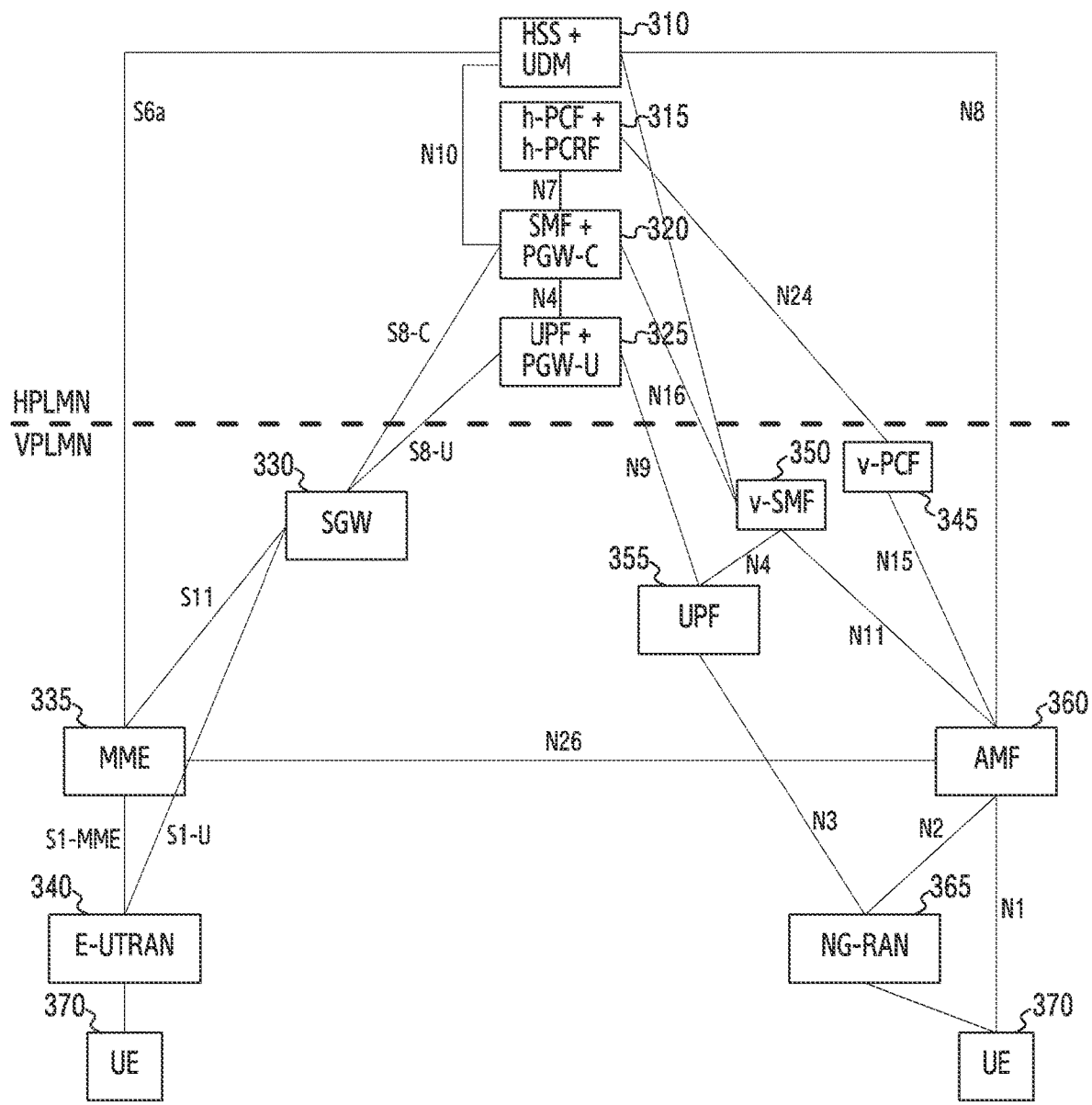
FIG. 3 illustrates a network slice interworking configuration (local breakout roaming) according to an embodiment of the disclosure.

The disclosure defines a method for interworking between an EPS network system and a 5G network system architecture for providing a network slice function. FIGS. 1, 2, and 3 illustrate an interworking structure of a 5G system (5GS) and an evolved packet system (EPS).

In addition, the disclosure defines a network operation and a UE operation, in which a session connection is established in an EPS to enable a UE using a communication service to use a service without disconnection even when the UE moves to a 5GS.

FIG. 1 illustrates an interworking structure of a 5GS and an EPS in a case of non-roaming according to an embodiment of the disclosure.

Referring to FIG. 1, a 5GS may include a new radio (NR) base station 150, an access and mobility management function (AMF) 145, a session management function (SMF) 120, a user plane function (UPF) 125, a policy control function (PCF) 115, and an unified data management (UDM) 110. An EPS may include an evolved universal terrestrial radio access (E-UTRA) base station 140, a mobility management entity (MME) 135, a serving gateway (SGW) 130, a packet data network gateway-user (PGW-U) 125, a packet data network gateway-control (PGW-C) 120, a policy and charging rules function (PCRF) 115, and a home subscriber serve (HSS) 110. The UDM 110 of the 5GS and the HSS 110 of the EPS may be constituted as a single combo node. The SMF 120 of the 5GS and the PGW-C 120 of the EPS may be constituted as a single combo node. A node of UDM+HSS 110 may store UE subscription information. The UPF 125 of the 5GS and the PGW-U 125 of the EPS may be constituted as a single combo node. A UE 155 may access the MME 135 of the EPS via the E-UTRA base station 140 to use an EPS network service. In addition, the UE 155 may access the AMF 145 of the 5GS via the NR base station 150 to use a 5GS network service.

FIG. 2 illustrates an interworking structure of a 5GS and an EPS in a case of local breakout roaming according to an embodiment of the disclosure. As illustrated in FIG. 1, a UE 260 may access an MME 240 of an EPS via an E-UTRA base station 245 to use an EPS network service.

Referring to FIG. 2, in addition, the UE 260 may access an AMF 250 of a 5GS via an NR base station 255 to use a 5GS network service. In the interworking structure of a 5GS and an EPS in a case of local breakout roaming, a node of SMF+PGW-C 225 may be located in a visited PLMN (VPLMN). N1, N2, N3, N8, N10, N11, N15, N26, S1-MME, S1-U, S6a, S11, S5-C and S5-U shown in FIG. 1 and FIG. 2 represent interfaces among network elements in the EPS and the 5GS.

FIG. 3 illustrates an interworking structure of a 5GS and an EPS in a case of home-routed roaming according to an embodiment of the disclosure. As illustrated in FIG. 1, a UE 370 may access an MME 335 of an EPS via an E-UTRA base station 340 to use an EPS network service.

Referring to FIG. 3, in addition, the UE 370 may access an AMF 360 of a 5GS via an NR base station (NG-RAN) 365 to use a 5GS network service. In the interworking structure of a 5GS and an EPS in a case of home-routed roaming, a node of SMF+PGW-C 320 may be located in a home PLMN (HPLMN). N1, N2, N3, N8, N9, N10, N11, N15, N16, N24, N26, S1-MME, S1-U, S6a, S11, S8-C and S8-U shown in FIG. 3 represent interfaces among network elements in the EPS and the 5GS.

Figure 4:
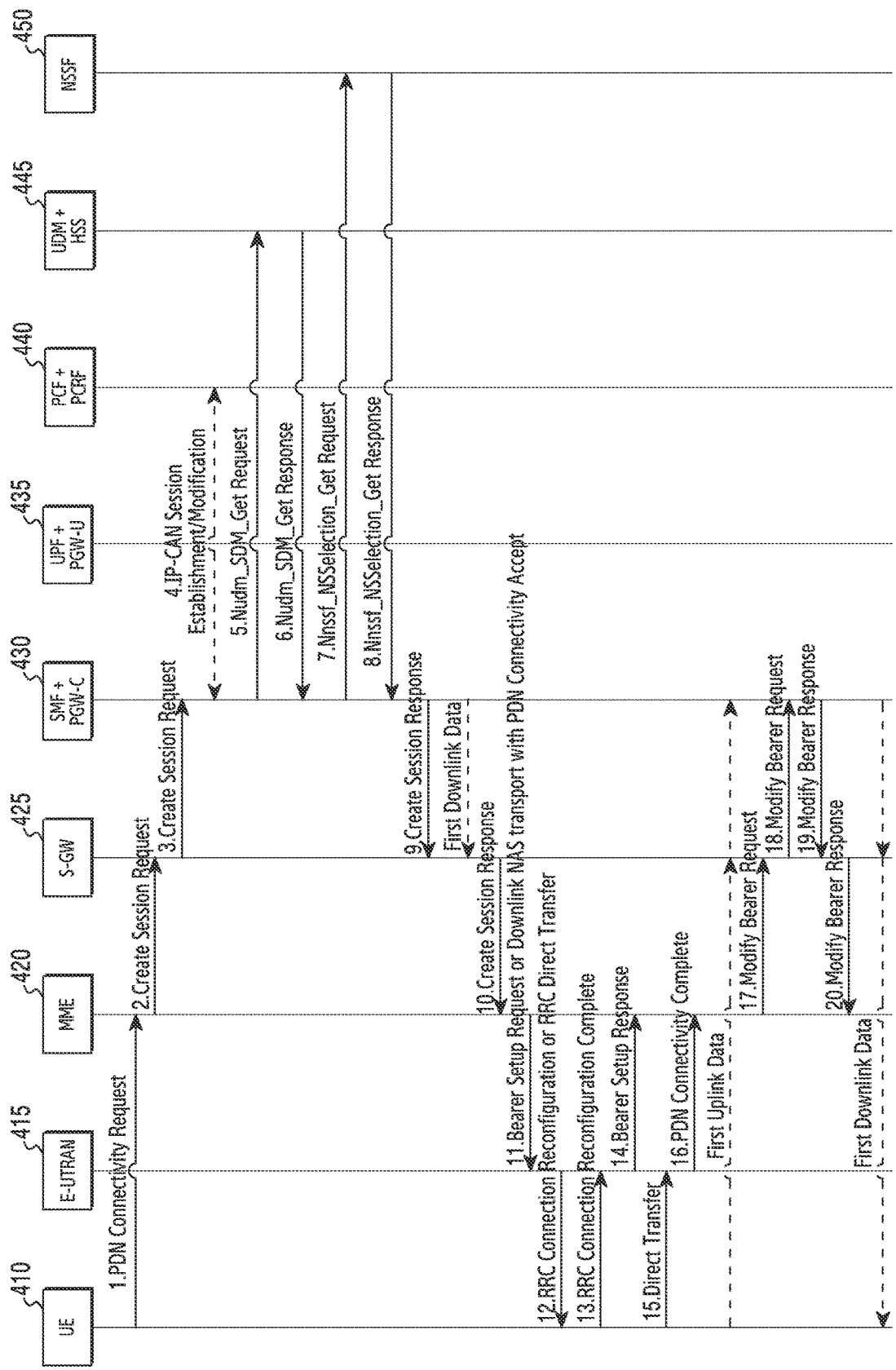
FIG. 4 illustrates a network slice interworking configuration (home-routed roaming) according to an embodiment of the disclosure.

FIG. 4 illustrates a procedure for establishing, by a UE 410 according to an embodiment of the disclosure, packet data network (PDN) connection in an EPS.

Referring to FIG. 4, the UE 410 may establish PDN connection by accessing an MME 420 via an E-UTRA base station 415 to exchange a signaling message with a PGW-C 430 located in an EPS. When the establishment of PDN connection is completed, the UE 410 may transmit uplink data to a PGW-U 435 or receive downlink data from the PGW-U 435.

Procedure 1: the UE 410 may transmit a PDN connectivity request message to the MME 420 for the establishment of PDN connection. The PDN connectivity request message may be transmitted to the MME 420 via the E-UTRA base station 415.

Procedure 2: upon receiving the PDN connectivity request message in procedure 1, the MME 420 may transmit a create session request message to an S-GW 425.

Procedure 3: upon receiving the create session request message in procedure 2, the S-GW 425 may transmit a create session request message to the SMF+PGW-C 430.

Procedure 4: upon receiving the create session request message in procedure 3, the SMF+PGW-C 430 may perform an internet protocol connectivity access network (IP-CAN) session establishment/modification procedure along with a PCF+PCRF 440.

Procedure 5: upon receiving the create session request message in procedure 3, the SMF+PGW-C 430 may transmit an Nudm_SDM_Get request message to an UDM+HSS 445. The Nudm_SDM_Get request message may include a data type of requested subscription information, and information on a key accessible to the data type of the subscription information. According to an embodiment of the disclosure, "slice selection subscription data" may be included as a data type of requested subscription information, and UE's ID "SUPT" may be included as a key accessible to the data type of the subscription information.

Procedure 6: upon receiving the Nudm_SDM_Get request message in procedure 5, the UDM+HSS 445 may, from a database (UDR), retrieve network slice subscription information of a UE corresponding to the received UE's ID SUPI, when the Nudm_SDM_Get request message includes a parameter "slice selection subscription data". According to an embodiment of the disclosure, the network slice subscription information may be configured by at least one S-NSSAI, and be called subscribed S-NSSAIs. Upon retrieving subscribed S-NSSAIs of the UE corresponding to the received SUPI, the UDM+HSS 445 may transmit an Nudm_SDM_Get response message to the SMF+PGW-C 430. The Nudm_SDM_Get response message may include "subscribed S-NSSAIs" information of the UE corresponding to the SUPI. The "subscribed S-NSSAIs" may include at least one default S-NSSAI. In order to describe the disclosure, the "subscribed S-NSSAIs" can be described by an example as follows.

Subscribed S-NSSAIs: {S-NSSAI 1, S-NSSAI 2, S-NSSAI 3(default)}

The UE 410 subscribes to three S-NSSAIs, and it may be assumed that, among the three S-NSSAIs, S-NSSAI 3 is a default S-NSSAI.

Figure 5:
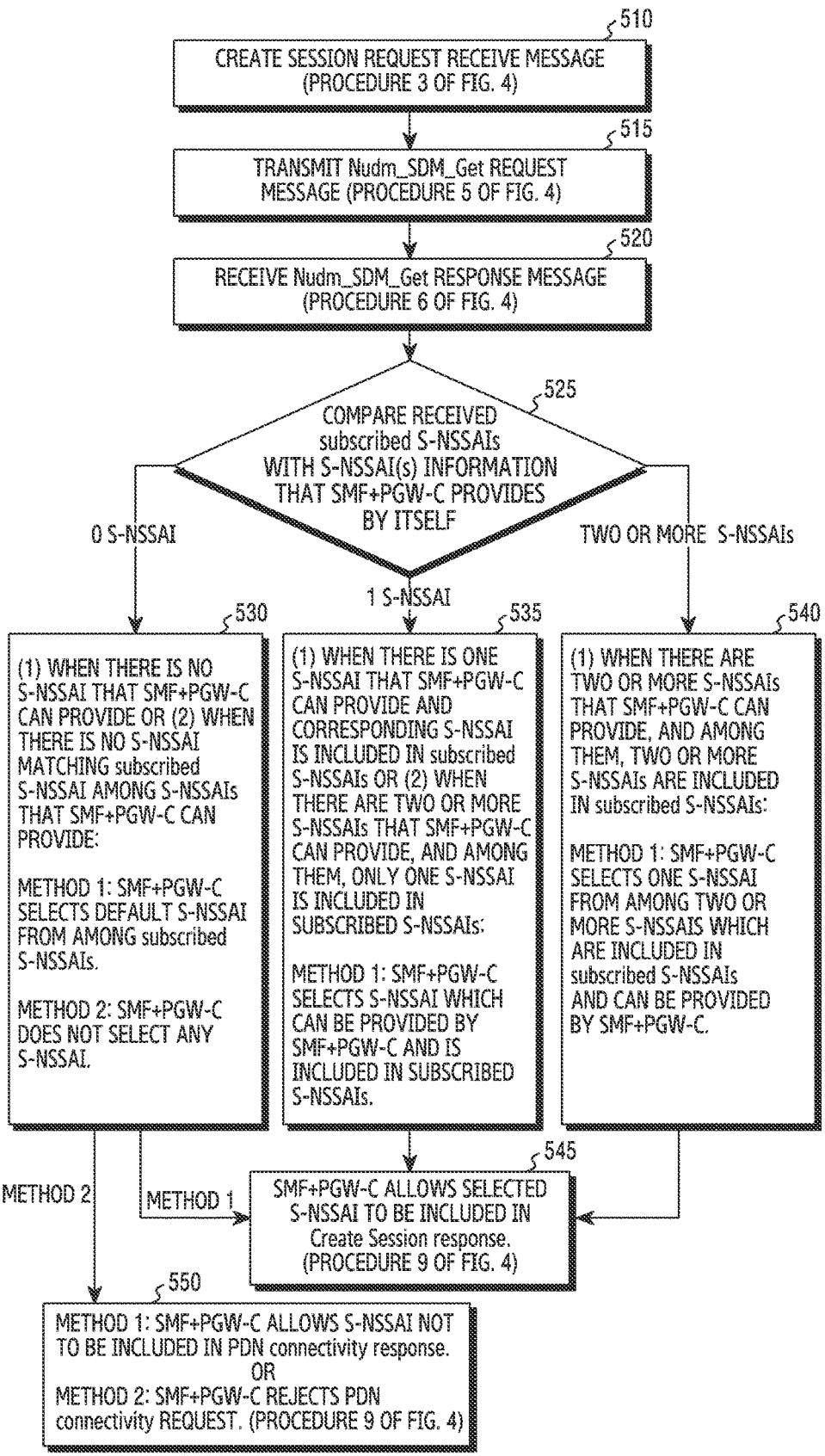
FIG. 5 illustrates session management function+packet data network gateway-control (SMF+PGW-C) operation for supporting network slice interworking according to an embodiment of the disclosure.

When PLMN ID included in the UE's ID SUPI matches PLMN ID in which the SMF+PGW-C 430 is located (that is, corresponding to the embodiments of FIGS. 1 and 3), as illustrated in FIG. 5, upon receiving the Nudm_SDM_Get response message, the SMF+PGW-C 430 may perform an operation of the SMF+PGW-C 430 of enabling the SMF+PGW-C 430 to select an S-NSSAI.

FIG. 5 illustrates SMF+PGW-C operation for supporting network slice interworking according to an embodiment of the disclosure.

Referring to FIG. 5, operations 510, 515 and 520 correspond to procedures 3, 5 and 6 of FIG. 4. Upon receiving the Nudm_SDM_Get response message (operation 520), the SMF+PGW-C 430 may identify (operation 525) whether an S-NSSAI, which the SMF+PGW-C 430 can provide, is included in the "subscribed S-NSSAIs" included in the Nudm_SDM_Get response message received in procedure 6.

When there is no S-NSSAI that the SMF+PGW-C 430 can provide (operation 530) or when there is no S-NSSAI matching the "subscribed S-NSSAIs" received in procedure 6, among one or more S-NSSAIs that the SMF+PGW-C 430 can provide (operation 530), the SMF+PGW-C 430 may select a default S-NSSAI from among the "subscribed S-NSSAIs" received in procedure 6 (method 1), or may not select any S-NSSAI (method 2). In operation 550, the SMF-PGW-C may not include slice information in a create session response (method 2_1) or the SMF-PGW-C may reject the create session request (method 2_2). Alternatively, in operation 545, the create session response message of procedure 9 may include slice information, which has been selected through the procedure.

When there is one S-NSSAI that the SMF+PGW-C 430 can provide and the corresponding S-NSSAI is included in the "subscribed S-NSSAIs" received in procedure 6 (operation 535), or when there is one S-NSSAI matching the "subscribed S-NSSAIs" received in procedure 6, among two or more S-NSSAIs that the SMF+PGW-C 430 can provide (operation 535), the SMF+PGW-C 430 may select one S-NSSAI which can be provided by the SMF+PGW-C 430 and is included in the "subscribed S-NSSAIs". In operation 545, the create session response message of procedure 9 may include slice information, which has been selected through the procedure.

When there are two or more S-NSSAIs which the SMF+PGW-C 430 can provide, and among them, two or more S-NSSAIs are included in the "subscribed S-NSSAIs" (operation 540), the SMF+PGW-C 430 may select one S-NSSAI from among the two or more S-NSSAIs which are included in the "subscribed S-NSSAIs" and can be provided by the SMF+PGW-C 430, based on a mobile carrier policy configured in the SMF+PGW-C 430. In operation 545, the create session response message of procedure 9 may include slice information, which has been selected through the procedure.

When PLMN ID included in the UE's ID SUPI matches PLMN ID in which the SMF+PGW-C 430 is located (that is, corresponding to the embodiments of FIGS. 1 and 3), procedures 7 and 8 may not be performed.

When PLMN ID included in the UE's ID SUPI does not match PLMN ID in which the SMF+PGW-C 430 is located (that is, corresponding to the embodiment of FIG. 2), procedures 7 and 8 may be performed.

Procedure 7: upon receiving the Nudm_SDM_Get response message in procedure 6, the SMF+PGW-C 430 may transmit an Nnssf_NSSelection_Get request message to an NSSF 450. The Nnssf_NSSelection_Get request message may include "PLMN ID" included in the UE's ID SUPI and the "subscribed S-NSSAIs" of the UE, received from the UDM+HSS 445 in procedure 6. The "PLMN ID" included in the SUPI may indicate a UE's HPLMN. The "subscribed S-NSSAIs" may indicate slice information used in the UE's HPLMN.

Procedure 8: upon receiving the Nnssf_NSSelection_Get request message in procedure 7, the NSSF 450 may derive "mapped S-NSSAIs" which are mapped with the "subscribed S-NSSAIs" included in the request message to be used in a VPLMN. In order to describe the disclosure, the "subscribed S-NSSAIs" and the "mapped S-NSSAIs" can be described through an example as follows.

Subscribed S-NSSAIs: {S-NSSAI 1, S-NSSAI 2, S-NSSAI 3(default)}

Mapped S-NSSAIs: {(S-NSSAI 1, S-NSSAI a), (S-NSSAI 2, S-NSSAI b), (S-NSSAI 3, S-NSSAI c)}

S-NSSAIs included in the "subscribed S-NSSAIs" may be configured by a slice value (for example, S-NSSAI 1) used in the UE's HPLMN. S-NSSAIs included in the "mapped S-NSSAIs" may be configured by a pair (for example, (S-NSSAI 1, S-NSSAI a)) of slice values (for example, S-NSSAI a) mapped with a slice value (for example, S-NSSAI 1) used in the UE's HPLMN to be used in the VPLMN.

The NSSF 450 may transmit an Nnssf_NSSelection_Get response message to the SMF+PGW-C 430. The Nnssf_NSSelection_Get response message may include the "mapped S-NSSAIs".

Figure 6:
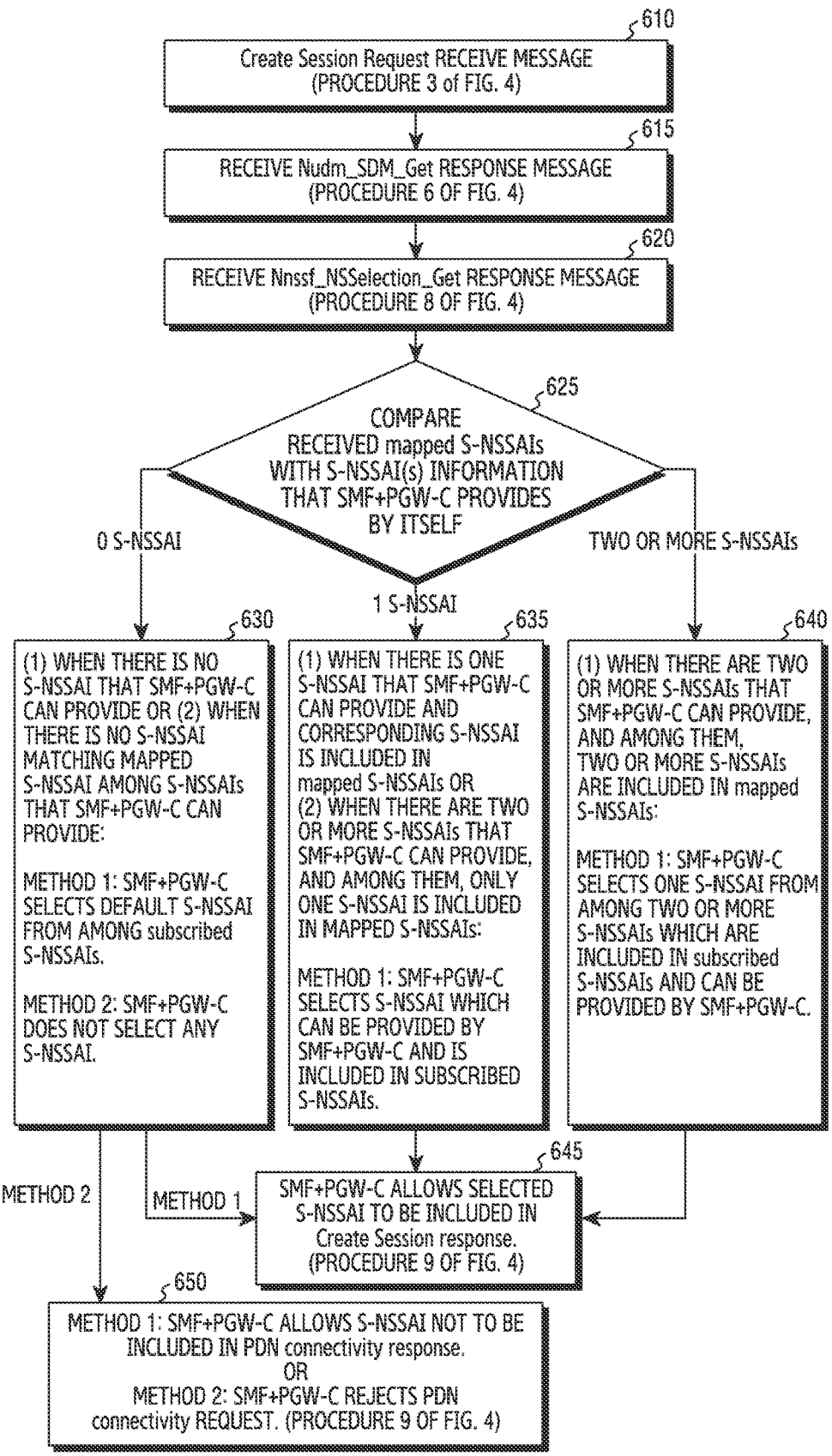
FIG. 6 illustrates SMF+PGW-C operation for supporting network slice interworking according to an embodiment of the disclosure.

Upon receiving the Nnssf_NSSelection_Get response message, the SMF+PGW-C 430 may perform an operation of the SMF+PGW-C 430 of enabling the SMF+PGW-C 430 to select an S-NSSAI as illustrated in FIG. 6.

FIG. 6 illustrates SMF+PGW-C operation for supporting network slice interworking according to an embodiment of the disclosure.

Referring to FIG. 6, operations 610, 615 and 620 correspond to procedures 3, 6 and 8 of FIG. 4. Upon receiving the Nnssf_NSSelection_Get response message (operation 620), the SMF+PGW-C 430 may identify (operation 625) whether an S-NSSAI, which can be provided by the SMF+PGW-C 430 by using "mapped S-NSSAIs" information included in the Nnssf_NSSelection_Get response message, is included in the "subscribed S-NSSAIs" included in the Nudm_SDM_Get response message received in procedure 6. For the operation above, the SMF+PGW-C 430 may use the received "mapped S-NSSAIs" information to interpret "subscribed S-NSSAIs" information.

For example, when a slice provided by the SMF+PGW-C 430 is S-NSSAI a, the SMF+PGW-C 430 may use the received "mapped S-NSSAIs" information to identify that S-NSSAI 1 mapped with S-NSSAI a which is a slice provided by the SMF+PGW-C 430, is included in the "subscribed S-NSSAIs".

Subscribed S-NSSAIs: {S-NSSAI 1, S-NSSAI 2, S-NSSAI 3(default)}

Mapped S-NSSAIs: {(S-NSSAI 1, S-NSSAI a), (S-NSSAI 2, S-NSSAI b), (S-NSSAI 3, S-NSSAI c)}

In addition, for example, when a slice provided by the SMF+PGW-C 430 is S-NSSAI d, the SMF+PGW-C 430 may use the received "mapped S-NSSAIs" information to identify that S-NSSAI d, which is a slice provided by the SMF+PGW-C 430, is not included in the "subscribed S-NSSAIs".

Subscribed S-NSSAIs: {S-NSSAI 1, S-NSSAI 2, S-NSSAI 3(default)}

Mapped S-NSSAIs: {(S-NSSAI 1, S-NSSAI a), (S-NSSAI 2, S-NSSAI b), (S-NSSAI 3, S-NSSAI c)}

For example, when slices provided by the SMF+PGW-C 430 are S-NSSAI a and S-NSSAI d, the SMF+PGW-C 430 may use the received "mapped S-NSSAIs" information to identify that, among slices provided by the SMF+PGW-C

430, S-NSSAI a is included in the "subscribed S-NSSAIs", but S-NSSAI d is not included in the "subscribed S-NS-SAIs".

Subscribed S-NSSAIs: {S-NSSAI 1, S-NSSAI 2, S-NSSAI 3(default)}

Mapped S-NSSAIs: {(S-NSSAI 1, S-NSSAI a), (S-NSSAI 2, S-NSSAI b), (S-NSSAI 3, S-NSSAI c)}

For example, when slices provided by the SMF+PGW-C 430 are S-NSSAI a and S-NSSAI c, the SMF+PGW-C 430 may use the "mapped S-NSSAIs" information received as follows, so as to identify that, both S-NSSAI a and S-NSSAI c, which are provided by the SMF+PGW-C 430, are included in the "subscribed S-NSSAIs".

Subscribed S-NSSAIs: {S-NSSAI 1, S-NSSAI 2, S-NSSAI 3(default)}

Mapped S-NSSAIs: {(S-NSSAI 1, S-NSSAI a), (S-NSSAI 2, S-NSSAI b), (S-NSSAI 3, S-NSSAI c)}

When there is no S-NSSAI that the SMF+PGW-C 430 can provide (operation 630), or when there is no S-NSSAI matching the "subscribed S-NSSAIs" received in procedure 6, among one or more S-NSSAIs (for example, S-NSSAI d) that the SMF+PGW-C 430 can provide (operation 630), the SMF+PGW-C 430 may select a default S-NSSAI from among the "subscribed S-NSSAIs" received in procedure 6 (method 1), or may not select any S-NSSAI (method 2). In operation 650, the SMF-PGW-C may not include slice information in a create session response (method 2_1) or the SMF-PGW-C may reject the create session request (method 2_2). Alternatively, in operation 645, the create session response message of procedure 9 may include slice information, which has been selected through the procedure.

When there is one S-NSSAI (for example, S-NSSAI a) that the SMF+PGW-C 430 can provide and the corresponding S-NSSAI is included in the "subscribed S-NSSAIs" received in procedure 6 (for example, S-NSSAI 1 mapped with S-NSSAI a) (operation 635), or when there is one S-NSSAI (for example, S-NSSAI 1 mapped with S-NSSAI a, no S-NSSAI of HPLMN, mapped with S-NSSAI d) matching the "subscribed S-NSSAIs" received in procedure 6, among two or more S-NSSAIs (for example, S-NSSAI a and S-NSSAI d) that the SMF+PGW-C 430 can provide (operation 635), the SMF+PGW-C 430 may select one S-NSSAI which can be provided by the SMF+PGW-C 430 and is included in the "subscribed S-NSSAIs". That is, in operation 645, the create session response message of procedure 9 may include slice information, which has been selected through the procedure.

When there are two or more S-NSSAIs that the SMF+PGW-C 430 can provide, and among them, two or more S-NSSAIs are included in the "subscribed S-NSSAIs" (operation 640), the SMF+PGW-C 430 may select one S-NSSAI from among the two or more S-NSSAIs which are included in the "subscribed S-NSSAIs" and can be provided by the SMF+PGW-C 430, based on a mobile carrier policy configured in the SMF+PGW-C 430. That is, in operation 645, the create session response message of procedure 9 may include slice information, which has been selected through the procedure.

Procedure 9: upon receiving the Nudm_SDM_Get response message in procedure 6 (i.e. the embodiments of FIGS. 1 and 3) or receiving the Nnssf_NSSelection_Get response message in procedure 8 (i.e. the embodiment of FIG. 2), the SMF+PGW-C 430 may transmit a create session response message to the S-GW 425.

The create session response message may include slice information, which has been selected through the procedure of FIG. 5 or 6, in the form of protocol configuration options (PCO) (operations 545, 645). The slice information included in the create session response message may include various methods. The slice information included in the create session response message may be transmitted to the UE 410 through procedures 10, 11, and 12.

In addition, the SMF+PGW-C 430 may store, in the UDM+HSS 445, S-NSSAI, which is slice information selected through the procedure of FIG. 5 or 6, and PDN connection information (for example, PDN connectivity ID etc.) supported by the S-NSSAI.

In a case of local breakout roaming (i.e. the embodiment of FIG. 2), according to an embodiment of the disclosure, an example of slice information included in the create session response message will be described. In order to describe an embodiment of the disclosure, it is assumed that the SMF+PGW-C 430 performs an operation of FIG. 6 to select S-NSSAI 1 as follows.

Subscribed S-NSSAIs: {S-NSSAI 1, S-NSSAI 2, S-NSSAI 3(default)}

Mapped S-NSSAIs: {(S-NSSAI 1, S-NSSAI a), (S-NSSAI 2, S-NSSAI b), (S-NSSAI 3, S-NSSAI c)}

[LB embodiment 1]: the SMF+PGW-C 430 according to an embodiment of the disclosure may allow S-NSSAI a, which is mapped to the selected S-NSSAI 1 to be used in a VPLMN, to be included in the form of protocol configuration options (PCO), in the create session response message. The PCO may include PLMN ID using S-NSSAI a, i.e. VPLMN ID.

Create Session Response msg: { . . . , PCO(S-NSSAI a)}

[LB embodiment 2]: the SMF+PGW-C 430 may allow S-NSSAI a, which is mapped to the selected S-NSSAI 1 to be used in a VPLMN, and mapping information corresponding to S-NSSAI a to be included in the form of PCO, in the create session response message. The PCO may include PLMN ID using S-NSSAI a, i.e. VPLMN ID.

Create Session Response msg: { . . . , PCO(S-NSSAI a, (S-NSSAI 1, S-NSSAI a))} or

Create Session Response msg: { . . . , PCO((S-NSSAI 1, S-NSSAI a))}

[LB embodiment 3]: the SMF+PGW-C 430 may allow the selected S-NSSAI 1 to be included in the form of PCO, in the create session response message. The PCO may include PLMN ID using S-NSSAI 1, i.e. HPLMN ID.

Create Session Response msg: { . . . , PCO(S-NSSAI 1)}

[LB embodiment 4]: the SMF+PGW-C 430 may allow the selected S-NSSAI 1 and mapping information corresponding to S-NSSAI 1 to be included in the form of PCO, in the create session response message. The PCO may include PLMN ID using S-NSSAI 1, i.e. HPLMN ID, and PLMN ID using S-NSSAI a, i.e. VPLMN ID.

Create Session Response msg: { . . . , PCO(S-NSSAI 1, (S-NSSAI 1, S-NSSAI a))} or

Create Session Response msg: { . . . , PCO((S-NSSAI 1, S-NSSAI a))}

[LB embodiment 5]: the SMF+PGW-C 430 may allow the selected slice information not to be included in the create session response message.

Create Session Response msg: { . . . }

In a case of home-routed roaming (i.e. the embodiment of FIG. 3), according to an embodiment of the disclosure, an example of the slice information included in the create session response message will be described. In order to describe an embodiment of the disclosure, it is assumed that the SMF+PGW-C 430 performs an operation of FIG. 5 to select S-NSSAI 1 as follows.

Subscribed S-NSSAIs: {S-NSSAI 1, S-NSSAI 2, S-NSSAI 3(default)}

[HR embodiment 1]: the SMF+PGW-C 430 according to an embodiment of the disclosure may allow the selected S-NSSAI 1 to be included in the form of PCO, in the create session response message. The PCO may include PLMN ID using S-NSSAI 1, i.e. HPLMN ID.

Create Session Response msg: { . . . , PCO(S-NSSAI 1)}

[HR embodiment 2]: the SMF+PGW-C 430 may allow the selected slice information not to be included in the create session response message.

Create Session Response msg: { . . . }

Procedure 10: upon receiving the create session response message in procedure 9, the S-GW 425 may transmit a create session response message to the MME 420. The create session response message, which the S-GW 425 transmits to the MME 420, may include the slice information included in the create session response message received in procedure 9.

Procedure 11: upon receiving the create session response message in procedure 10, the MME 420 may transmit a bearer setup request message or a "downlink NAS transport-with-PDN connectivity accept" message to the E-UTRA base station 415. The message, which the MME 420 transmits to the E-UTRA base station 415, may include the slice information included in the create session response message received in procedure 10.

Procedure 12: upon receiving the bearer setup request message or the "downlink NAS transport-with-PDN connectivity accept" message in procedure 11, the E-UTRA base station 415 may transmit an RRC connection reconfiguration message or an RRC direct transfer message to the UE 410. The message, which the E-UTRA base station 415 transmits to the UE 410, may include the slice information included in the message received in procedure 11.

Upon receiving the RRC connection reconfiguration message or the RRC direct transfer message, the UE 410 may store S-NSSAI, i.e. the slice information included in the message, and PLMN ID using the corresponding S-NSSAI. The slice information may be included in the form of PCO, in the message.

Procedure 13: upon receiving the RRC connection reconfiguration message in procedure 12, the UE 410 may transmit an RRC connection reconfiguration complete message to the E-UTRA base station 415.

Procedure 14: upon receiving the RRC connection reconfiguration complete message in procedure 13, the E-UTRA base station 415 may transmit a bearer setup response message to the MME 420.

Procedure 15: upon receiving the RRC direct transfer message in procedure 12, the UE 410 may transmit a direct transfer message to the E-UTRA base station 415.

Procedure 16: upon receiving the direct transfer message in procedure 15, the E-UTRA base station 415 may transmit a PDN connectivity complete message to the MME 420. Procedure 17: the MME 420 sends a modify bearer request to the S-GW 425. Procedure 18: the S-GW 425 forwards the modify bearer request to the SMF+PGW-C 430. Procedure 19: the SMF+PGW-C 430 sends the modify bearer response to the S-GW 425. Procedure 20: the S-GW 425 forwards the modify bearer response to the MME 420.

As illustrated in FIG. 4, a UE according to an embodiment of the disclosure may access an EPS network to establish PDN connection and transmit or receive data. The UE may move to a 5GS network, and at this point, the UE may provide PDN connection-related information established in the EPS network, to the 5GS network.

FIG. 10 illustrates a process in which according to an embodiment of the disclosure, the UE moves to the 5G network to perform a registration procedure. More specifically, a UE 260, 370, or 1010 moves to a 5GS to transmit a registration request message to an AMF 250, 360, or 1020.

Referring to FIG. 10, the registration request message may include PDN connection-related information established in an EPS network. The PDN connection-related information may include requested NSSAI which is slice information requested by the UE, and other slice information (for example, mapping information, indication, PLMN ID using an S-NSSAI included in the requested NSSAI, etc.). The requested NSSAI may be configured by at least one S-NSSAI. The registration request message may be transmitted to the AMF 250, 360, or 1020 via an NG-RAN 255, 365, or 1015. The PDN connection-related information included in the registration request message may include various methods.

Hereinafter, in a case of local breakout roaming (i.e. the embodiment of FIG. 2), an example of a method for, according to an embodiment of the disclosure, providing PDN connection-related information established in an EPS, to a 5GS network will be described.

According to an embodiment, in a case of [LB embodiment 1] of procedure 9 of FIG. 4, a registration request message which a UE 260 or 1010 according to an embodiment of the disclosure transmits to an AMF 250 or 1020 via an NG-RAN 255 or 1015 may include S-NSSAI a received in procedure 12 of FIG. 4 as requested NSSAI, and may include PLMN ID using S-NSSAI a, i.e. VPLMN ID.

According to an embodiment, in a case of [LB embodiment 2] of procedure 9 of FIG. 4, a registration request message which a UE 260 or 1010 according to an embodiment of the disclosure transmits to an AMF 250 or 1020 via an NG-RAN 255 or 1015 may include S-NSSAI a received in procedure 12 of FIG. 4 as requested NSSAI, and may include mapping information (S-NSSAI 1, S-NSSAI a) corresponding to S-NSSAI a, and PLMN ID using S-NSSAI a, i.e. VPLMN ID.

When the UE's ID (for example, 5G-GUTI, GUTI, or SUPI) includes information allocated in an EPS, or when the received registration request message includes VPLMN ID, the AMF 250 or 1020 according to [LB embodiment 1] and [LB embodiment 2] may identify that the requested NSSAI included in the registration request received from the UE is configured by an S-NSSAI value used in a VPLMN.

According to an embodiment, in a case of [LB embodiment 3] of procedure 9 of FIG. 4, a registration request message which a UE 260 or 1010 according to an embodiment of the disclosure transmits to an AMF 250 or 1020 via an NG-RAN 255 or 1015 may include S-NSSAI 1 received in procedure 12 of FIG. 4 as requested NSSAI, and may include PLMN ID using S-NSSAI 1, i.e. HPLMN ID.

According to an embodiment, in a case of [LB embodiment 4] of procedure 9 of FIG. 4, a registration request message which a UE 260 or 1010 according to an embodiment of the disclosure transmits to an AMF 250 or 1020 via an NG-RAN 255 or 1015 may include S-NSSAI 1 received in procedure 12 of FIG. 4 as requested NSSAI, and may include mapping information (S-NSSAI 1, S-NSSAI a) corresponding to S-NSSAI 1, and PLMN ID using S-NSSAI 1, i.e. HPLMN ID.

When the UE's ID (for example, 5G-GUTI, GUTI, or SUPI) includes information allocated in an EPS, or when the received registration request message includes HPLMN ID, the AMF 250 or 1020 according to [LB embodiment 3] and [LB embodiment 4] may identify that the requested NSSAI included in the registration request received from the UE is configured by an S-NSSAI value used in an HPLMN.

According to an embodiment, in a case of [LB embodiment 5] of procedure 9 of FIG. 4, a registration request message, which a UE 260 or 1010 according to an embodiment of the disclosure transmits to an AMF 250 or 1020 via an NG-RAN 255 or 1015, may not include slice-related information. That is, the registration request message may not include requested NSSAI.

When UE's ID (for example, 5G-GUTI, GUTI, or SUPI) includes information allocated in an EPS, the AMF 250 or 1020 according to [LB embodiment 5] may identify that the UE is a UE which has moved from the EPS. The AMF 250 or 1020 may obtain, from an UDM 210 of FIG. 2 or 1030, PDN connection information that the UE configures in the EPS, and S-NSSAI information supported by PDN connection. The AMF 250 or 1020 may allow the S-NSSAI supported by PDN connection, which is obtained from the UDM 210 or 1030, to be included in allowed NSSAI of a registration accept message which is to be transmitted to the UE, and may then transmit the S-NSSAI.

Hereinafter, in a case of home-routed roaming (i.e. the embodiment of FIG. 3), according to an embodiment of the disclosure, an example of a method for providing, to a 5GS network, PDN connection-related information established in an EPS will be described.

According to an embodiment, in a case of [HR embodiment 1] of procedure 9 of FIG. 4, a registration request message which a UE 370 or 1010 according to an embodiment of the disclosure transmits to an AMF 360 or 1020 via an NG-RAN 365 or 1015 may include S-NSSAI 1 received in procedure 12 of FIG. 4 as requested NSSAI. When the registration request message includes S-NSSAI 1, the registration request message may include PDU session status of S-NSSAI 1.

According to an embodiment, in a case of [HR embodiment 1] of procedure 9 of FIG. 4, a registration request message which a UE 370 or 1010 according to an embodiment of the disclosure transmits to an AMF 360 or 1020 via an NG-RAN 365 or 1015 may include S-NSSAI 1 received in procedure 12 of FIG. 4 as requested NSSAI, and may include indication indicating that S-NSSAI 1 is a value used in an HPLMN. When the registration request message includes S-NSSAI 1, the registration request message may include PDU session status of S-NSSAI 1.

According to an embodiment, in a case of [HR embodiment 1] of procedure 9 of FIG. 4, a registration request message which a UE 370 or 1010 according to an embodiment of the disclosure transmits to an AMF 360 or 1020 via an NG-RAN 365 or 1015 may include S-NSSAI 1 received in procedure 12 of FIG. 4 as requested NSSAI, and may include PLMN ID using S-NSSAI 1, i.e. HPLMN ID. When the registration request message includes S-NSSAI 1, the registration request message may include PDU session status of S-NSSAI 1.

When UE's ID (for example, 5G-GUTI, GUTI, or SUPI) includes information allocated in an EPS, when the received registration request message includes HPLMN ID, or when the received registration request message includes indication indicating an HPLMN value, the AMF 360 or 1020 according to [HR embodiment 1] may identify that the requested NSSAI included in the registration request received from the UE is configured by an S-NSSAI value used in an HPLMN.

In procedure 5 (operation 1055) of FIG. 10, the AMF 360 or 1020 may obtain "subscribed S-NSSAIs" information of a UE corresponding to the UE's ID from the UDM 310 of FIG. 3 or 1030. The AMF 360 or 1020 may compare requested NSSAI received from the UE 1010 with subscription slice information obtained from the UDM. If the S-NSSAI included in the requested NSSAI is included in the subscription slice information, procedure 6 (operation 1060) of FIG. 10 may be performed. Alternatively, procedure 5 (operation 1055) of FIG. 10 is omitted and procedure 6 (operation 1060) may be directly performed. In addition, in procedure 6 (operation 1060) of FIG. 10, the AMF 360 or 1020 may transmit an NSSelection_Get request message to an NSSF 1025. The NSSelection_Get request message may include LIE subscription slice information, PLMN ID (i.e. HPLMN ID) included in LIE's ID (for example, SUPI), an HPLMN S-NSSAI value (according to an embodiment of the disclosure, S-NSSAI 1) which is received from the UE and by which the UE establishes a session, and requested NSSAI received from the UE.

The NSSF 1025 may determine a VPLMN S-NSSAI value which is mapped with the HPLMN S-NSSAI value (for example, HPLMN S-NSSAI value included in requested NSSAI) received from the AMF 360 or 1020 and is available in a VPLMN (i.e. serving PLMN which a UE currently accesses). The NSSF 1025 may determine allowed NSSAI, based on the UE subscription slice information, the VPLMN S-NSSAI value determined by the NSSF, and a requested NSSAI value. The allowed NSSAI may be configured by at least one VPLMN S-NSSAI value available in a serving PLMN which the UE currently accesses. The NSSF 1025 may transmit an NSSelection_Get response message to the AMF 360 or 1020. The NSSelection_Get response message may include the allowed NSSAI determined by the NSSF, and mapping of allowed NSSAI, corresponding to the allowed NSSAI. Upon receiving the NSSelection_Get response message, the AMF 360 or 1020 may transmit a registration accept message to the UE 1010 in procedure 7 (operation 1065) and procedure 8 (operation 1070) of FIG. 10. The registration accept message may include the allowed NSSAI and mapping of allowed NSSAI, which are received from the NSSF. Upon receiving the registration accept message, the UE 1010 may store the allowed NSSAI and the mapping of allowed NSSAI, which are included in the registration accept message, and may use the same to manage(create/modify/delete) a PDU session in a current registration area and transmit or receive data.

According to an embodiment, in a case of [HR embodiment 1] of procedure 9 of FIG. 4, a registration request message which a UE 370 or 1010 according to an embodiment of the disclosure transmits to an AMF 360 or 1020 via an NG-RAN 365 or 1015 may not include requested NSSAI or may configure an S-NSSAI value to be "unknown" in the requested NSSAI. In addition, the registration request message may include mapping information (S-NSSAI 1, unknown). That is, the UE may include S-NSSAI 1 received in procedure 12 of FIG. 4 as an HPLMN S-NSSAI value of the mapping information, and may configure the VPLMN S-NSSAI value to be "unknown" or may not include any value (empty). When the registration request message includes S-NSSAI 1, the registration request message may include PDU session status of S-NSSAI 1.

In procedure 5 (operation 1055) of FIG. 10, the AMF 360 or 1020 according to [HR embodiment 1] may obtain "subscribed S-NSSAIs" information of the UE corresponding to the UE's ID from the UDM 310 or 1030. The AMF 360 or 1020 may compare the S-NSSAI value received from the UE and used in an HPLMN with the subscription slice information obtained from the UDM. If the HPLMN S-NSSAI value received from the UE is included in the subscription slice information, procedure 6 (operation 1060) of FIG.

10 may be performed. Alternatively, procedure 5 (operation 1055) of FIG. 10 is omitted and procedure 6 (operation 1060) may be performed. The AMF 360 or 1020 may transmit an NSSelection_Get request message to the NSSF 1025 (operation 1055). The NSSelection_Get request message may include LIE subscription slice information, PLMN ID (i.e. HPLMN ID) included in LIE's ID (for example, SUPI), mapping information received from the UE, an HPLMN S-NSSAI value (according to an embodiment of the disclosure, S-NSSAI 1) which is received from the UE and by which the LIE establishes a session, and requested NSSAI received from the UE.

The NSSF 1025 may determine a VPLMN S-NSSAI value which is mapped with the HPLMN S-NSSAI value (for example, HPLMN S-NSSAI value included in mapping information or HPLMN S-NSSAI value by which the UE establishes a session) received from the AMF 360 or 1020 and is available in a VPLMN (i.e. serving PLMN which the UE currently accesses). The NSSF 1025 may determine allowed NSSAI, based on UE subscription slice information, the HPLMN S-NSSAI value included in mapping information, the VPLMN S-NSSAI value determined by the NSSF, and a requested NSSAI value. The allowed NSSAI may be configured by at least one VPLMN S-NSSAI value available in a serving PLMN which the UE currently accesses. The NSSF 1025 may transmit an NSSelection_Get response message to the AMF 360 or 1020. The NSSelection_Get response message may include the allowed NSSAI determined by the NSSF and mapping of allowed NSSAI, corresponding to the allowed NSSAI. Upon receiving the NSSelection_Get response message, the AMF 1020 may transmit a registration accept message to the UE 1010 in procedure 7 (operation 1065) and procedure 8 (operation 1070) of FIG. 10. The registration accept message may include allowed NSSAI and mapping of allowed NSSAI, which are received from the NSSF. Upon receiving the registration accept message, the UE 1010 may store the allowed NSSAI and mapping of allowed NSSAI which are included in the registration accept message, and may use the same to manage(create/modify/delete) a PDU session in a current registration area and transmit or receive data.

According to an embodiment, in a case of [HR embodiment 2] of procedure 9 of FIG. 4, a registration request message which a UE 370 or 1010 according to an embodiment of the disclosure transmits to an AMF 360 or 1020 via an NG-RAN 365 or 1015 may not include slice-related information. That is, the registration request message may not include requested NSSAI.

When UE's ID (for example, 5G-GUTI, GUTI, or SUPI) includes information allocated in an EPS, the AMF 360 or 1020 according to [HR embodiment 2] may identify that the UE is a UE which has moved from the EPS. The AMF 360 or 1020 may obtain, from the UDM 1030, PDN connection information that the UE configures in the EPS, and S-NSSAI information supported by PDN connection. The AMF 360 or 1020 may allow an S-NSSAI supported by PDN connection, which is obtained from the UDM 310 or 1030, to be included in allowed NSSAI of the registration accept message, and may transmit the message to the UE 370 or 1010.

According to an embodiment of the disclosure, an operation of determining allowed NSSAI and mapping of allowed NSSAI may be performed by the AMF 1020, not by the NSSF 1025. That is, procedure 6 (operation 1060) of FIG. 10 may be processed by an internal operation of the AMF.

A UE according to an embodiment of the disclosure may store slice information which is included in the form of PCO, in the message received in procedure 12 of FIG. 4. The slice information in the form of PCO, received by the UE, may indicate an "S-NSSAI" value connected to PDN connection, "PLMN ID" using the corresponding S-NSSAI, and "mapped slice" information. The UE may compare the received slice information with slice policy information (for example, UE route selection policy (URSP), network slice selection policy (NSSP), UE local policy, etc.) previously stored in the UE, and may determine whether the slice information matches the slice policy information. Table 1 represents an example of the slice policy information stored in the UE.

TABLE 1

| Application identifier | Slice identifier (S-NSSAI) |
|---|---|
| Application id #1 | S-NSSAI 1 |
| Application id #2 | S-NSSAI 2 |
| Application id #3 | S-NSSAI 1, S-NSSAI 2 |
| Matching all | S-NSSAI 3 |

The slice policy information stored in the UE includes applications installed in the UE and slice information used to use each of the applications. For example, in a case of application id #1 of the UE, S-NSSAI 1 is used to provide a service. A UE which intends to use application id #1 may perform a registration procedure by accessing a 5G network. In the registration procedure, the UE may transmit a registration request message to a network, thus the registration request message may include slice information (S-NSSAI) that the UE intends to use, in the form of requested NSSAI. In the registration procedure, the UE may receive, from the network, allowed NSSAI which is slice information that the UE can use by accessing the network. The UE may use the allowed NSSAI and the slice policy information to, when transmitting a PDU session establishment request message for application id #1, allow S-NSSAI 1 to be included in the PDU session establishment request message.

When the PCO received by the UE includes an "S-NSSAI" value (for example, S-NSSAI 1) and "PLMN ID" using the corresponding S-NSSAI, i.e. HPLMN ID, the UE may use the slice policy information stored in the UE to identify slice information mapped with an application that the UE uses by accessing the EPS and generating PDN connection.

When an application that the UE currently uses is application id #1, a slice having been identified based on the slice policy information stored in the UE may be S-NSSAI 1. In this case, it may be determined that the slice (S-NSSAI 1) having been identified based on the slice policy information stored in the UE matches slice information (S-NSSAI 1) received using the PCO. When in procedure 1 (operation 1035) of FIG. 10, requested NSSAI and mapping of requested NSSAI are generated, the UE may allow S-NSSAI 1 to be included in the requested NSSAI or the mapping of requested NSSAI.

Alternatively, when an application that the UE currently uses is application id #2, a slice having been identified based on the slice policy information stored in the UE may be S-NSSAI 2. In this case, it may be determined that the slice (S-NSSAI 2) having been identified based on the slice policy information stored in the UE does not match slice information (S-NSSAI 1) received using the PCO. When in procedure 1 (operation 1035) of FIG. 10, requested NSSAI and mapping of requested NSSAI are generated, the UE may allow S-NSSAI 1 and S-NSSAI 2 to be included in the requested NSSAI or the mapping of requested NSSAI.

When the PCO received by the UE includes an "S-NSSAI" value (for example, S-NSSAI a), "PLMN ID" using the corresponding S-NSSAI, i.e. VPLMN ID, and "mapped slice information" (for example, {S-NSSAI 1, S-NSSAI a}), the UE may use the slice policy information stored in the UE to identify slice information mapped with an application that the UE uses by accessing the EPS and generating PDN connection.

When an application that the UE currently uses is application id #1, a slice having been identified based on the slice policy information stored in the UE may be S-NSSAI 1. In this case, it may be determined that the slice (S-NSSAI 1) having been identified based on the slice policy information stored in the UE matches slice information ({S-NSSAI 1, S-NSSAI a}) received using the PCO. When in procedure 1 (operation 1035) of FIG. 10, requested NSSAI and mapping of requested NSSAI are generated, the UE may allow S-NSSAI a to be included in the requested NSSAI, and may allow {S-NSSAI 1, S-NSSAI a} to be included in the mapping of requested NSSAI.

Alternatively, when an application that the UE currently uses is application id #2, a slice having been identified based on the slice policy information stored in the UE may be S-NSSAI 2. In this case, it may be determined that the slice (S-NSSAI 2) having been identified based on the slice policy information stored in the UE does not match slice information ({S-NSSAI 1, S-NSSAI a}) received using the PCO. When in procedure 1 (operation 1035) of FIG. 10, requested NSSAI and mapping of requested NSSAI are generated, the UE may allow S-NSSAI a and unknown indication to be included in the requested NSSAI, and may allow {S-NSSAI 1, S-NSSAI a} and {S-NSSAI 2, unknown(or empty)} to be included in the mapping of requested NSSAI.

Referring to FIG. 10, in procedure 2 (operation 1040), the UE 1010 may transmit a registration request message to the base station 1015 in order to register in a communication system. In procedure 3 (operation 1045), the base station 1015 performs requested NSSAI identification and AMF selection based on slice information. In procedure 4 (operation 1050), the base station 1015 may transmit the registration request message to the AMF 1020 to access.

The registration request message transmitted in procedures 2 and 4 (operations 1040, 1050) may include requested NSSAI which the UE 1010 intends to use after registering in a communication system. In procedure 1 (operation 1035), the requested NSSAI may be determined by the UE 1010, based on configured NSSAI. The requested NSSAI and the configured NSSAI may be configured by at least one S-NSSAI.

In procedure 5 (operation 1055), upon receiving the registration request message 1050, the AMF 1020 may obtain UE subscription information from the UDM 1030. The UE subscription information may include subscribed S-NSSAIs of the UE 1010.

In procedure 6 (operation 1060), the AMF 1020 may determine the requested NSSAI received from the UE 1010 in procedure 4 (operation 1050), the subscribed S-NSSAIs received from the UDM 1030 in procedure 5 (operation 1055), and allowed NSSAI which, based on the slice information available at the current position of the UE 1010, the UE 1010 can use after registering in a communication system.

In procedure 6 (operation 1060), the AMF 1020 may request the NSSF 1025 to determine allowed NSSAI. To this end, the AMF 1020 may provide, to the NSSF 1025, the requested NSSAI received from the UE 1010 in procedure 4 (operation 1050), the subscribed S-NSSAIs received from the UDM 1030 in procedure 5 (operation 1055), and current position information of the UE 1010. The NSSF 1025 may determine allowed NSSAI, which the UE 1010 can use after registering in a communication system, based on the information received from the AMF 1020 and the slice information available at the current position of the UE 1010. The NSSF 1025 may transmit the allowed NSSAI to the AMF 1020.

At this point, if there is no slice that a UE can use after registering in a communication system, the AMF 1020 and the NSSF 1025 may generate rejected S-NSSAIs with respect to the slice included in the requested NSSAI received from the UE 1010 in procedure 4 (operation 1050), and may constitute allowed NSSAI by using various methods as follows.

According to one or more embodiments, the AMF 1020 or the NSSF 1025 may identify subscribed S-NSSAIs of the UE 1010, and if a default S-NSSAI is included in the subscribed S-NSSAIs, the AMF 1020 or the NSSF 1025 may allow the default S-NSSAI to be included in the allowed NSSAI. According to an embodiment, if a default S-NSSAI is not included in the subscribed S-NSSAIs, the AMF 1020 or the NSSF 1025 may configure the subscribed S-NSSAIs to be "empty", or may determine the subscribed S-NSSAIs not to be transmitted to the UE 1010.

According to one or more embodiments, the AMF 1020 or the NSSF 1025 may configure the subscribed S-NSSAIs to be "empty".

According to one or more embodiments, the AMF 1020 or the NSSF 1025 may determine the subscribed S-NSSAIs not to be transmitted to the UE 1010.

Upon determining (or obtaining, from the NSSF 1025,) the allowed NSSAI and rejected S-NSSAIs in procedure 6 (operation 1060), the AMF 1020 may allow at least one of the allowed NSSAI and rejected S-NSSAIs to be included in the registration accept message transmitted to the UE 1010 in procedure 7 (operation 1065). The registration accept message of procedure 7 (operation 1065) may be transmitted to the UE 1010 via the base station 1015 in procedure 8 (operation 1070).

Upon receiving the registration accept message in procedure 8 (operation 1070), the UE 1010 may identify the allowed NSSAI and/or rejected S-NSSAIs included in the registration accept message and may perform an operation as follows.

According to one or more embodiments, if the registration accept message received in procedure 8 (operation 1070) includes only the rejected S-NSSAIs and does not include the allowed NSSAI, the UE 1010 may identify that all the requested slices, which the UE requests from a network through procedures 1, 2, and 4 (operations 1035, 1040, 1050), are rejected. Therefore, the UE 1010 may not send a PDU session request until receiving the allowed NSSAI from the network. Alternatively, when the UE sends a PDU session request until receiving the allowed NSSAI from the network, the UE 1010 may not include the S-NSSAI. Upon receiving the PDU session request message which does not include the S-NSSAI, the network (for example, SMF or AMF) may select a default S-NSSAI and generate a PDU session, based on subscription information of the UE 1010.

According to one or more embodiments, when the registration accept message received in procedure 8 (operation 1070) includes the rejected S-NSSAIs and the allowed NSSAI is configured to be "empty", the UE 1010 may identify that all the requested slices, which the UE requests from a network through procedures 1, 2, and 4 (operations 1035, 1040, 1050), are rejected. Therefore, the UE 1010 may not send a PDU session request until receiving the allowed NSSAI from the network. Alternatively, when the UE sends a PDU session request until receiving the allowed NSSAI from the network, the UE 1010 may not include the S-NSSAI. Upon receiving the PDU session request message which does not include the S-NSSAI, the network (for example, SMF or AMF) may select a default S-NSSAI and generate a PDU session, based on subscription information of the UE 1010.

According to one or more embodiments, if the rejected S-NSSAIs of the registration accept message received in procedure 8 (operation 1070) includes all the requested slices, which the UE 1010 requests from a network through procedures 1, 2, and 4 (operations 1035, 1040, 1050) (that is, all the requested slices of the UE are rejected) and the allowed NSSAI includes the S-NSSAIs, the UE 1010 may identify that all the requested slices, which the UE requests from a network through procedures 1, 2, and 4 (operations 1035, 1040, 1050), are rejected. Further, the UE 1010 may use the allowed NSSAIs, which the UE 1010 has received in procedure 8 (operation 1070) until receiving new allowed NSSAI from the network, in order to send a PDU session request. According to one embodiment, when the UE sends a PDU session request, the UE 1010 may allow one S-NSSAI of the allowed NSSAIs received in procedure 8 (operation 1070), to be included in the PDU session request message.

Figure 7:
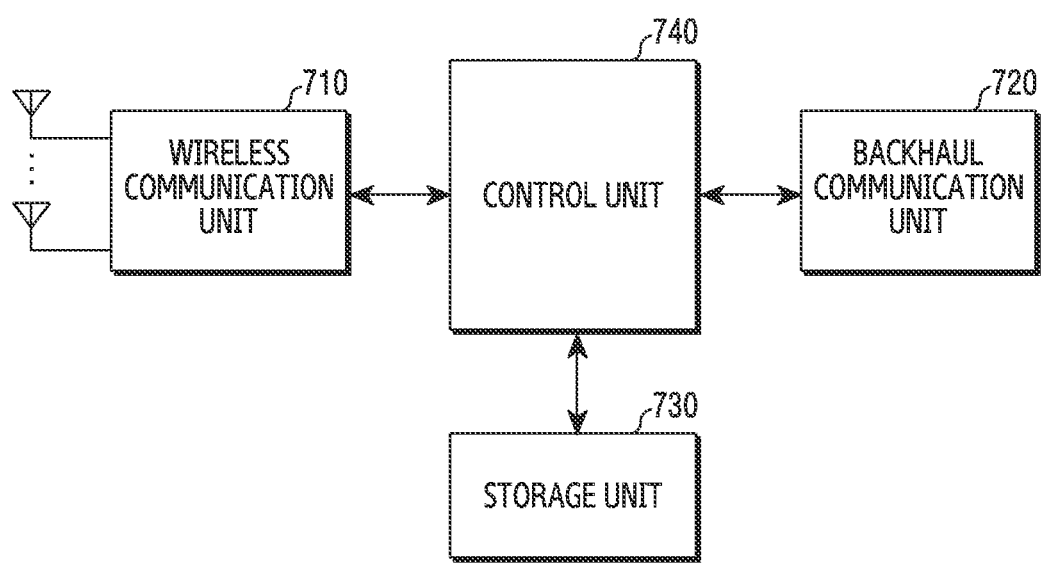
FIG. 7 illustrates a configuration of a base station in a wireless communication system according to an embodiment of the disclosure.

FIG. 7 illustrates a configuration of a base station in a wireless communication system, according to an embodiment of the disclosure. The configuration illustrated in FIG. 7 may be understood as a configuration of a base station 140, 245, or 340 of an EPS or a base station 150, 255, or 365 of a 5GS. The term "~unit" or "~er" used hereinafter may refer to the unit for processing at least one function or operation and may be implemented in hardware, software, or a combination of hardware and software.

Referring to FIG. 7, a base station includes a wireless communication unit 710, a backhaul communication unit 720, a storage unit 730, and a control unit 740.

The wireless communication unit 710 executes functions for transmitting or receiving signals through a wireless channel. For example, the wireless communication unit 710 performs a function of conversion between a baseband signal and a bit stream according to a physical layer standard of a system. For example, when data is transmitted, the wireless communication unit 710 encodes and modulates a transmission bit stream so as to generate complex symbols. In addition, when data is received, the wireless communication unit 710 restores a reception bit stream by demodulating and decoding a baseband signal.

The wireless communication unit 710 up-converts a baseband signal into a radio-frequency (RF) band signal and transmits the same through an antenna, and down-converts an RF band signal received through an antenna into a baseband signal. To this end, the wireless communication unit 710 may include a transmission filter, a reception filter, an amplifier, a mixer, an oscillator, a digital-to-analog convertor (DAC), an analog-to-digital convertor (ADC), and the like. In addition, the wireless communication unit 710 may include multiple transmission/reception paths. The wireless communication unit 710 may include at least one antenna array configured by multiple antenna elements.

In an aspect of hardware, the wireless communication unit 710 may include a digital unit and an analog unit, and the analog unit may include multiple sub-units according to operation power, operation frequency, and the like. The digital unit may be implemented as at least one processor (for example, digital signal processor (DSP)).

The wireless communication unit 710 may transmit or receive a signal as described above. Therefore, the entire or a part of the wireless communication unit 710 may be called a "transmitter", "receiver", or "transceiver". Hereinafter, the transmission and reception performed through a wireless channel may be understood to mean that the above-described processing is performed by the wireless communication unit 710.

The backhaul communication unit 720 provides an interface for performing communication with other nodes in a 5GS network or EPS network. That is, the backhaul communication unit 720 converts a bit stream transmitted from a base station to another node, for example, another access node, another base station, an upper node, or a core network, into a physical signal, and converts a physical signal received from another node into a bit stream.

The storage unit 730 may store data, such as a basic program for operating a base station, an application program, and configuration information. The storage unit 730 may be configured as a volatile memory, a non-volatile memory, or a combination of a volatile memory and a non-volatile memory. The storage unit 730 provides stored data according to a request of the control unit 740.

The control unit 740 may control the overall operation of a base station. For example, the control unit 740 transmits or receives a signal via the wireless communication unit 710 or the backhaul communication unit 720. In addition, the control unit 740 records data in the storage unit 730 and reads the data. The control unit 740 may perform functions of a protocol stack, which are required by communication standards. According to other embodiments, a protocol stack may be included in the wireless communication unit 710. To this end, the control unit 740 may include at least one processor. According to various embodiments, the control unit 740 may include functions for network slicing interworking. The functions for network slicing interworking are instruction sets or codes stored in the storage unit 730, and may be instructions/codes residing at least temporarily in the control unit 740, a storage space in which instructions/codes are stored, or a part of a circuitry constituting the control unit 740.

According to various embodiments, the control unit 740 may receive a downlink NAS transport-with-PDN connectivity accept message or a bearer setup request message, which includes slice information, for network slicing interworking, and may control an RRC direct transfer message or an RRC connection reconfiguration message which may include slice information to be transmitted to a UE. For example, the control unit 740 may control the base station to perform operations according to various embodiments described above.

Figure 8:
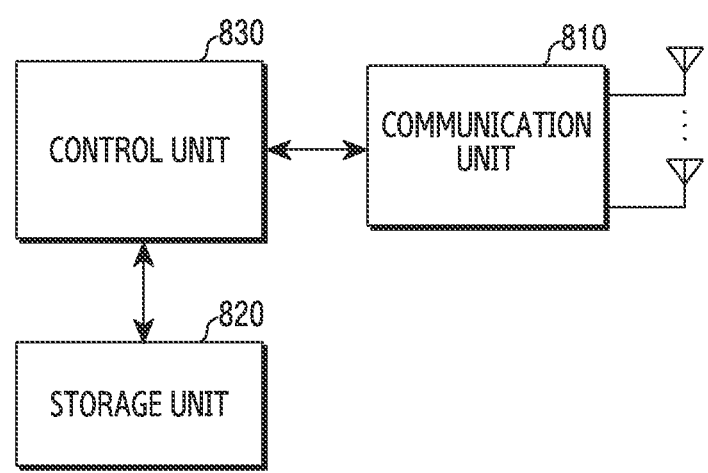
FIG. 8 illustrates a configuration of a UE in a wireless communication system according to an embodiment of the disclosure.

FIG. 8 illustrates a configuration of a UE in a wireless communication system, according to an embodiment of the disclosure. The configuration illustrated in FIG. 8 may be understood as a configuration of a UE 155, 260, or 370. The term "~unit" or "~er" used hereinafter may refer to the unit for processing at least one function or operation and may be implemented in hardware, software, or a combination of hardware and software.

Referring to FIG. 8, a UE includes a communication unit 810, a storage unit 820, and a control unit 830.

The communication unit 810 executes functions for transmitting or receiving a signal through a wireless channel. For example, the communication unit 810 performs a function of conversion between a baseband signal and a bit stream according to a physical layer standard of a system. For example, when data is transmitted, the communication unit 810 encodes and modulates a transmission bit stream so as to generate complex symbols. In addition, when data is received, the communication unit 810 restores a reception bit stream by demodulating and decoding a baseband signal. The communication unit 810 up-converts a baseband signal into a RF band signal and transmits the same through an antenna, and down-converts an RF band signal received through an antenna into a baseband signal. For example, the communication unit 810 may include a transmission filter, a reception filter, an amplifier, a mixer, an oscillator, a DAC, an ADC, and the like.

In addition, the communication unit 810 may include multiple transmission/reception paths. The communication unit 810 may include at least one antenna array configured by multiple antenna elements. In an aspect of hardware, the communication unit 810 may include a digital circuit and an analog circuit (for example, radio frequency integrated circuit (RFIC)). The digital circuit and the analog circuit may be implemented as a single package. In addition, the communication unit 810 may include multiple RF chains. The communication unit 810 may perform beam-forming The communication unit 810 may include different communication modules to process signals within different frequency bands. In addition, the communication unit 810 may include a plurality of communication modules for supporting a plurality of different radio access technologies. For example, different radio access technologies may include Bluetooth low energy (BLE), wireless fidelity (Wi-Fi), WiFi gigabyte (WiGig), a cellular network (for example, long term evolution (LTE)), a 5G network, and the like. In addition, different frequency bands may include a super high frequency (SHF) (for example, 2.5 GHz and 5 GHz) band and a millimeter (mm) wave (for example, 60 GHz) band.

The communication unit 810 may transmit or receive a signal as described above. Therefore, the entire or a part of the communication unit 810 may be called a "transmitter", "receiver", or "transceiver". Hereinafter, the transmission and reception performed through a wireless channel may be understood to mean that the above-described processing is performed by the communication unit 810.

The storage unit 820 may store data, such as a basic program for operating a UE, an application program, configuration information, and the like. The storage unit 820 may be configured as a volatile memory, a non-volatile memory, or a combination of a volatile memory and a non-volatile memory. The storage unit 820 provides stored data according to a request of the control unit 830.

The control unit 830 may control the overall operation of a UE. For example, the control unit 830 transmits or receives a signal via the communication unit 810. In addition, the control unit 830 records data in the storage unit 820 and reads the data. The control unit 830 may perform functions of a protocol stack, which are required by communication standards. To this end, the control unit 830 may include at least one processor or micro-processor, or may be a part of a processor. The part of the communication unit 810 and the control unit 830 may be called a communication processor (CP). According to various embodiments, the control unit 830 may include a function for supporting network slicing. The function for supporting network slicing is an instruction set or code stored in the storage unit 820, and may be an instruction/code residing at least temporarily in the control unit 830, a storage space in which instructions/codes are stored, or a part of a circuitry constituting the control unit 830.

According to various embodiments, the control unit 830 may control a UE to access the MME 420 via the E-UTRA base station 415 to exchange a signaling message with the PGW-C 430 located in an EPS and establish PDN connection, and when the establishment of PDN connection is completed, may control the UE 410 to transmit uplink data to the PGW-U 435 or receive downlink data from the PGW-U 435. Particularly, the control unit 830 may receive an RRC connection reconfiguration message or an RRC direct transfer message from the base station, and may store S-NSSAI, i.e. slice information included in the message, and PLMN ID using the corresponding S-NSSAI. For example, the control unit 830 may control the UE to perform operations according to various embodiments described above.

Figure 9:
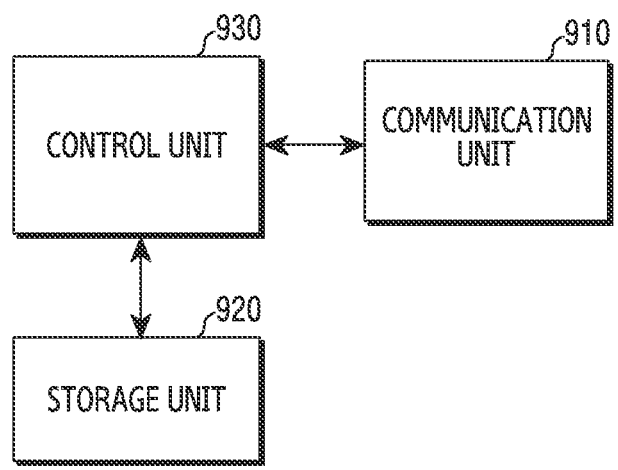
FIG. 9 illustrates a configuration of a core network device in a wireless communication system according to an embodiment of the disclosure.

FIG. 9 illustrates a configuration of a core network entity in a wireless communication system, according to an embodiment of the disclosure. The configuration illustrated in FIG. 9 may be understood as a configuration of an apparatus having at least one function of the HSS+UDM 110, 210, or 310, PCF+PCRF 115, 215, 220, or 315, SMF+PGW-C 120, 225, or 320, UPF+PGW-U 125, 230, or 325, SGW 130, 235, or 330, MME 135, 240, or 335, AMF 145, 250, or 360, UPF 355, v-SMF 350, and vPCF 345 of FIGS. 1 to 3. The term "~unit" or "~er" used hereinafter may refer to the unit for processing at least one function or operation and may be implemented in hardware, software, or a combination of hardware and software.

Referring to FIG. 9, a core network entity includes a communication unit 910, a storage unit 920, and a control unit 930.

The communication unit 910 provides an interface for performing communication with other devices in a network. That is, the communication unit 910 converts a bit stream transmitted from a core network entity to a different device, into a physical signal, and converts a physical signal received from a different device, into a bit stream. That is, the communication unit 910 may transmit or receive a signal. Therefore, the communication unit 910 may be called a "modem", "transmitter", "receiver", or "transceiver". The communication unit 910 may allow the core network entity to communicate with other devices or a system via backhaul connection (for example, wire backhaul or wireless backhaul) or via a network.

The storage unit 920 stores data such as a basic program for the operation of the core network entity, an application program, and configuration information. The storage unit 920 may be configured as a volatile memory, a non-volatile memory, or a combination of a volatile memory and a non-volatile memory. The storage unit 920 provides stored data according to a request of the control unit 930.

The control unit 930 controls the entire operations of the core network entity. For example, the control unit 930 transmits or receives a signal via the communication unit 910. In addition, the control unit 930 records data in the storage unit 920 and reads the data. To this end, the control unit 930 may include at least one processor. According to various embodiments, the control unit 930 may include a function for supporting network slicing. The function for supporting network slicing may be implemented by an instruction set or code stored in the storage unit 920, and may be an instruction/code residing at least temporarily in the control unit 930, a storage space in which an instruction/code is stored, or a part of a circuitry constituting the control unit 930.

According to various embodiments, the control unit 930 may: receive a create session request message; transmit an Nudm_SDM_Get request message; receive an Nudm_SDM_Get response message; compare the received subscribed S-NNSAIs with S-NSSAI information that the SMF-PGW-C provides by itself to select an S-NSSAI to be used; and control a function of enabling the S-SNSSAI to be included in a create session response message and transmitting the same to the UE, and the control unit 930 may perform control such that the core network entity performs operations according to various embodiments described above.

Methods according to claims of the disclosure or embodiments disclosed in the specification may be implemented in the form of hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program includes instructions that cause an electronic device to perform the methods according to embodiments disclosed in the claims or the specification of the disclosure.

The programs (software module, software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), other type optical storage devices, or a magnetic cassette. Alternatively, the programs may be stored in a memory configured by any combination of some or all of them. Further, a plurality of such memories may be included in an electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access an electronic device, which performs an embodiment of the disclosure, through an external port. Further, a separate storage device on the communication network may access an electronic device which performs an embodiment of the disclosure.

In the above-described detailed embodiments of the disclosure, a component included in the disclosure is expressed in the singular or the plural form according to a presented detailed embodiment. However, the singular form or plural form is selected for convenience of description suitable for the presented situation, and the disclosure is not limited to a single element or multiple elements thereof. Further, either multiple elements expressed in the description may be configured into a single element or a single element expressed in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   transmitting, to a first base station (BS), a packet data network (PDN) connection request message;
   receiving, from the first BS, information on a first network slice selection assistance information (NSSAI), the first NSSAI being selected by a network entity including a packet data network gateway control plane (PGW-C) and a session management function (SMF) from among at least one subscribed NSSAI associated with the UE;
   transmitting, to a second BS, a registration request message comprising a requested NSSAI including the first NSSAI; and
   receiving, from the second BS, a registration accept message comprising an allowed NSSAI including a second NSSAI mapped to the first NSSAI.

2. The method of claim 1, wherein the second NSSAI is for a visited public land mobile network (VPLMN) and the first NSSAI is for a home public land mobile network (HPLMN).

3. The method of claim 2, wherein the second NSSAI is identified by a network slice selection function (NSSF) entity.

4. The method of claim 2, wherein, in case of a home routed roaming, the first NSSAI is a HPLMN NSSAI.

5. The method of claim 1, wherein the first base station supports an evolved packet system (EPS), and the second BS supports a 5th generation system (5GS).

6. The method of claim 1, wherein the first NSSAI is received via a protocol configuration option (PCO).

7. The method of claim 1, further comprising:
   identifying whether the first NSSAI is matched with a user equipment route selection policy (URSP) rule.

8. A user equipment (UE) in a wireless communication system, the UE comprising:
   a transceiver; and
   at least one processor configured to:
      transmit, to a first base station (BS) via the transceiver, a packet data network (PDN) connection request message,
      receive, from the first BS via the transceiver, information on a first network slice selection assistance information (NSSAI), the first NSSAI being selected by a network entity including a packet data network gateway control plane (PGW-C) and a session management function (SMF) from among at least one subscribed NSSAI associated with the UE,
      transmit, to a second BS via the transceiver, a registration request message comprising a requested NSSAI including, the first NSSAI, and
      receive, from the second BS via the transceiver, a registration accept message comprising an allowed NSSAI including a second NSSAI mapped to the first NSSAI.

9. The UE of claim 8, wherein the second NSSAI is for a visited public land mobile network (VPLMN) and the first NSSAI is for a home public land mobile network (HPLMN).

10. The UE of claim 9, wherein the second NSSAI is identified by a network slice selection function (NSSF) entity.

11. The UE of claim 9, wherein, in case of a home routed roaming, the first NSSAI is a HPLMN NSSAI.

12. The UE of claim 8, wherein the first base station supports an evolved packet system (EPS), and the second BS supports a 5th generation system (5GS).

13. The UE of claim 8, wherein the first NSSAI is received via a protocol configuration option (PCO).

14. The UE of claim 8, wherein the at least one processor is further configured to:
   identify whether the first NSSAI is matched with a user equipment route selection policy (URSP) rule.

* * * * *